(12) United States Patent
Meszaros

(10) Patent No.: US 11,053,993 B2
(45) Date of Patent: Jul. 6, 2021

(54) INTEGRATED DEVICE FOR RESISTIVE TORQUE GENERATION

(71) Applicant: LORD Corporation, Cary, NC (US)

(72) Inventor: Daniel Meszaros, Geneva (CH)

(73) Assignee: LORD Corporation, Cary, NC (US)

( * ) Notice: Subject to any disclaimer, the term of this patent is extended or adjusted under 35 U.S.C. 154(b) by 791 days.

(21) Appl. No.: 15/533,241

(22) PCT Filed: Dec. 8, 2015

(86) PCT No.: PCT/US2015/064431
§ 371 (c)(1),
(2) Date: Jun. 5, 2017

(87) PCT Pub. No.: WO2016/094370
PCT Pub. Date: Jun. 16, 2016

(65) Prior Publication Data
US 2017/0363159 A1    Dec. 21, 2017

Related U.S. Application Data

(60) Provisional application No. 62/194,997, filed on Jul. 21, 2015, provisional application No. 62/088,961, filed on Dec. 8, 2014.

(51) Int. Cl.
*F16D 57/00* (2006.01)
*F16D 37/02* (2006.01)
(Continued)

(52) U.S. Cl.
CPC ........... *F16D 57/002* (2013.01); *F16D 37/02* (2013.01); *F16D 57/007* (2013.01); *H01F 1/447* (2013.01);
(Continued)

(58) Field of Classification Search
CPC ...... H02K 1/145; H02K 1/182; H02K 1/2793; H02K 7/104; H02K 7/106; H02K 7/11;
(Continued)

(56) References Cited

U.S. PATENT DOCUMENTS 2,762,248 A * 9/1956 Nelson .................. B25B 23/147
81/473
3,962,595 A    6/1976 Eddens
(Continued)

FOREIGN PATENT DOCUMENTS

WO    WO 03/036120 A2    5/2003
WO    2014/029446    2/2014

OTHER PUBLICATIONS

International Search Report and Written Opinion for Application No. PCT/US2015/064431 dated Apr. 11, 2016.
(Continued)

*Primary Examiner* — Jeremy A Luks
(74) *Attorney, Agent, or Firm* — Jenkins, Wilson, Taylor & Hunt, P.A.

(57) ABSTRACT

Integrated stator disk devices, systems, and methods for torque generation are provided. The resistive torque-generating device can include an integrated stator disk system including at least one metallic stator disk having a planar disk body, and at least one rotor disposed adjacent to the at least one metallic stator disk such that there are at least two shear areas formed by the at least one metallic stator disk and the at least one rotor; and magneto-rheological material disposed between portions of the at least one metallic stator disk and the at least one rotor. In some embodiments, the rotor(s) is/are a bent rotor(s), thereby providing for increased torque generation while fitting within tight space constraints.

27 Claims, 10 Drawing Sheets

(51) Int. Cl.
*H01F 1/44* (2006.01)
*H01F 7/16* (2006.01)
*F16D 37/00* (2006.01)
*F16D 65/02* (2006.01)

(52) U.S. Cl.
CPC ..... *H01F 7/1615* (2013.01); *F16D 2037/001* (2013.01); *F16D 2037/002* (2013.01); *F16D 2037/007* (2013.01); *F16D 2065/1388* (2013.01); *F16D 2500/10475* (2013.01); *F16D 2500/7044* (2013.01)

(58) Field of Classification Search
CPC ...... F16D 57/002; F16D 37/02; F16D 57/007; F16D 2037/001; F16D 2037/002; F16D 2037/007; F16D 2065/1388; F16D 2500/10475; F16D 2500/7044; H01F 1/447; H01F 7/1615
USPC .................... 310/103–105, 114, 26
See application file for complete search history.

(56) References Cited

U.S. PATENT DOCUMENTS

| | | | | |
|---|---|---|---|---|
| 4,896,754 | A * | 1/1990 | Carlson | F16D 37/008 188/267.1 |
| 5,469,947 | A * | 11/1995 | Anzai | B60H 1/3208 192/21.5 |
| 5,598,908 | A * | 2/1997 | York | F16D 37/02 188/267 |
| 5,779,013 | A * | 7/1998 | Bansbach | F16D 37/02 192/21.5 |
| 5,816,372 | A | 10/1998 | Carlson et al. | |
| 5,823,309 | A * | 10/1998 | Gopalswamy | F16D 37/02 192/21.5 |
| 5,842,547 | A * | 12/1998 | Carlson | F16D 55/00 188/267 |
| 5,845,753 | A * | 12/1998 | Bansbach | F16D 37/02 192/21.5 |
| 6,149,166 | A * | 11/2000 | Struss | B60G 21/055 267/191 |
| 6,186,290 | B1 | 2/2001 | Carlson | |
| 6,334,832 | B1 * | 1/2002 | Heravi | B60K 23/04 475/150 |
| 6,535,806 | B2 | 3/2003 | Millsap et al. | |
| 6,550,565 | B2 | 4/2003 | Thomas et al. | |
| 6,557,662 | B1 | 5/2003 | Andonian et al. | |
| 6,612,392 | B2 | 9/2003 | Park et al. | |
| 6,854,573 | B2 | 2/2005 | Jolly et al. | |
| 6,932,204 | B2 * | 8/2005 | Dolan | F16D 27/115 192/21.5 |
| 7,198,140 | B2 * | 4/2007 | Jolly | B62D 5/005 188/267 |
| 7,461,731 | B2 * | 12/2008 | Steinwender | F16D 37/02 188/267.1 |
| 7,588,131 | B2 * | 9/2009 | Steinwender | F16D 37/02 188/267.2 |
| 8,004,127 | B2 * | 8/2011 | Potter | H02K 19/103 310/114 |
| 8,157,689 | B2 * | 4/2012 | Steinwender | E05D 11/082 475/154 |
| 8,281,913 | B2 * | 10/2012 | Guggolz | B60W 10/02 192/218 |
| 8,397,883 | B2 * | 3/2013 | St. Clair | F16D 57/002 188/161 |
| 8,622,864 | B2 * | 1/2014 | Fauteux | B25J 9/102 475/91 |
| 2003/0079948 | A1 | 5/2003 | Jolly et al. | |
| 2003/0141155 | A1 | 7/2003 | Daneryd et al. | |
| 2004/0188198 | A1 * | 9/2004 | Na | F16D 57/002 188/267.2 |
| 2007/0289837 | A1 | 12/2007 | Wheals | |
| 2011/0045932 | A1 * | 2/2011 | Fauteux | B25J 9/102 475/221 |
| 2014/0299434 | A1 * | 10/2014 | Lull | F16D 37/02 192/21.5 |

OTHER PUBLICATIONS

Kikuchi et al., "Design and Development of Cylindrical MR Fluid Brake with Multi-Coil Structure," Journal of System Design and Dynamics, vol. 5, No. 7, pp. 1471-1484 (2011).
Kikuchi et al., "Gap-Size Effect of Compact MR Fluid Brake," Journal of Intelligent Material Systems and Structures, vol. 22, No. 15, pp. 1677-1683 (2011).
LORD TFD Steering Units: For steer-by-wire systems, Lord Corp., pp. 1-8 (2014).
Nagaya et al., "MR fluid viscous coupling and its torque delivery control," Tribology International, vol. 40, pp. 89-97 (2007).

* cited by examiner

INTEGRATED DEVICE FOR RESISTIVE TORQUE GENERATION

CROSS-REFERENCE TO RELATED APPLICATIONS

This application relates and claims priority to both U.S. Provisional Patent Application No. 62/088,961, filed on Dec. 8, 2014 and U.S. Provisional No. 62/194,997, filed on Jul. 21, 2015, the disclosure of each of which are incorporated by reference herein in the entirety.

TECHNICAL FIELD

The subject matter herein generally relates to the field of resistive torque-generating devices and systems (e.g., brakes, locks, clutches, tactile feedback devices, resistance-generating devices, motion control devices, and the like). More particularly, the subject matter herein relates to integrated stator disk devices, systems, and methods for magneto-responsive (MR) applications such as MR resistive torque-generating applications.

BACKGROUND

Magnetic field controllable devices may be used within resistive torque-generating systems, such as brakes, locks, clutches, tactile feedback devices, steer-by-wire applications, or the like. These devices can contain a quantity of a magnetically controllable material and a moveable member, such as a piston or rotor configured to pass through the magnetically controllable material. A coil or permanent magnet can generate a magnetic field for directing a magnetic flux through desired regions of the magnetically controllable material to generate torque and/or resistance during operation of the field controllable device.

In some instances, magnetic field controllable devices utilize magneto-responsive (MR) material, including magneto-rheological (MR) fluid, for generating torque or resistance. In the case of MR fluids, the MR fluid exhibits a rheology change (e.g., an increase in viscosity, torque, resistance to shear, or the like) upon exposure to the magnetic field. Increases in the magnitude of the magnetic field passing through the MR material increases the amount of resistance to shear or torque that can be generated by the MR device. The torque generated by an MR device, such as an MR brake, is proportional to its size or diameter. That is, in order to increase the amount of torque generated by an MR device, the size of the device must increase. This can be impractical and costly. This is also problematic where space limitations exist and/or where a compact MR device is needed.

Accordingly, there is a need for improved devices and systems for use within MR applications without having to increase the size or the cost of the respective MR device. One novel approach includes providing integrated stator disk devices, systems, and methods for MR applications that are more compact, cost effective, and efficient at generating torque.

SUMMARY

Improved disk assemblies and methods for magneto-responsive (MR) applications are disclosed herein. In some aspects, providing and using integrated stator disk assemblies within MR applications increases the amount of torque generated by a respective MR device, without having to increase the size or diameter of the MR device.

In one aspect an integrated stator disk system for resistive torque generation is provided. The integrated stator disk comprising at least one stator disk, at least one rotor, at least two poles, a coil and a magneto-responsive material. The at least one stator disk has a planar disk body. The at least one rotor is disposed adjacent to the at least one stator disk such that there are at least two shear areas formed by the at least one stator disk and the at least one rotor. The at least two poles positioned about the at least one stator disk and the at least one rotor. The coil proximate the at least two poles. The magneto-responsive material is disposed about a portion of the at least one rotor and positioned between at least a portion of the at least one stator disk and the at least one rotor.

In another aspect, a tactile steering system is provided. The tactile steering system comprising a steering device and a resistive torque-generating system. The resistive torque-generating system for providing tactile feedback to the steering device, wherein the resistive torque-generating device is attached to the steering device via a shaft. The resistive torque-generating system further comprises an integrated stator disk system and a magneto-responsive material. The integrated stator disk system includes at least one stator disk having a planar disk body, at least one rotor disposed adjacent to the at least one stator disk such that there are at least two shear areas formed by the at least one stator disk and the at least one rotor, at least two poles positioned about the at least one stator disk and the at least one rotor, and a coil proximate the at least two poles. The magneto-resistive material is disposed about a portion of the at least one rotor and between at least a portion of the at least one stator disk and the at least one rotor.

In yet another aspect, a bent rotor device for generating resistive torque is provided. The bent rotor device comprises a housing, at least two poles, at least one stator disk, at least one bent rotor, a coil and a magneto-resistive (MR) material. The at least two poles are enclosed within the housing. The at least one stator disk has a planar disk body and has at least a portion positioned between the at least two poles. The at least one bent rotor has a bend between a top surface and a bottom surface of the at least one bent rotor, the at least one bent rotor being positioned proximate to the at least one stator disk, wherein the at least one bent rotor has at least a portion positioned between the at least two poles. The coil is proximate the at least two poles, the coil includes a non-metallic bobbin and a length of metallic winding that is coiled around the non-metallic bobbin. The non-metallic bobbin is disposed around an interior surface of the at least two poles. The coil is configured to generate a magnetic field. The MR material is disposed between portions of the at least one bent rotor and the at least one stator disk.

In another aspect, a bent rotor device for generating resistive torque is provided. The bent rotor device comprises a housing, at least two poles, at least one bent rotor, a coil and a magneto-resistive (MR) material. The at least two poles are enclosed within the housing. The at least one bent rotor has a bend between a top surface and a bottom surface of the at least one bent rotor, wherein the at least one bent rotor has at least a portion positioned between the at least two poles. The coil is proximate the at least two poles, the coil includes a non-metallic bobbin and a length of metallic winding that is coiled around the non-metallic bobbin. The non-metallic bobbin is disposed around an interior surface of the at least two poles. The coil is configured to generate a magnetic field. The MR material is disposed between portions of the at least one bent rotor and the at least one stator disk.

Numerous objects and advantages of the subject matter will become apparent as the following detailed description of the preferred embodiments is read in conjunction with the drawings, which illustrate such embodiments.

DETAILED DESCRIPTION

Figure 1:
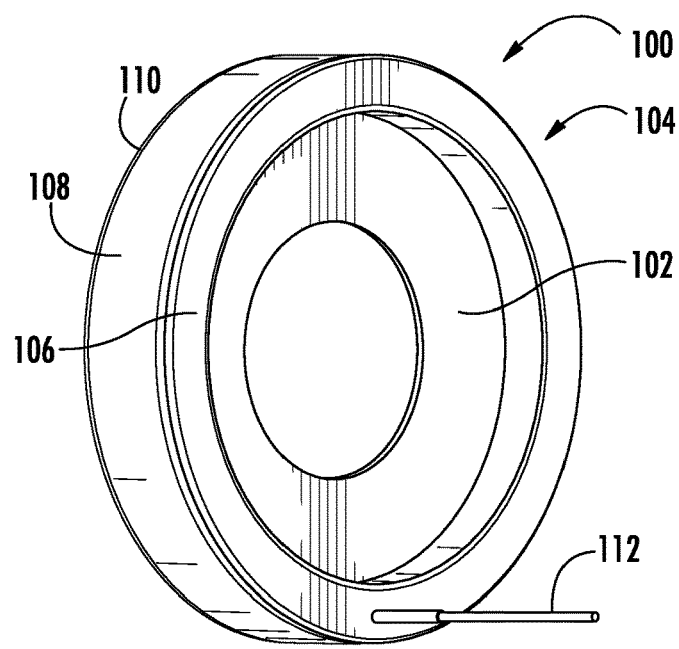
FIG. 1 is a perspective view of an exemplary integrated stator disk device.

FIGS. 1 to 14 illustrate various aspects, views, and/or features associated with integrated stator disk devices, systems, and methods for torque generation. In some embodiments, an integrated stator disk device is incorporated into a resistive torque-generating device for forming an integrated stator disk system, such as, for example, a magneto-responsive (MR) device including MR material for use with any number of steer-by-wire, clutching, locking, tactile feedback, and/or braking applications.

In some embodiments, electrical systems are used to generate resistance in steer-by-wire applications for simulating mechanical/hydraulic steering within various vehicles such as cars, trucks, boats, off-road devices, construction vehicles, etc. In some embodiments, electrical systems are used for simulating the power level of fitness equipment such as stationary bicycles, rowing machines, etc. In some embodiments, electrical systems are used for making a simple actuator precisely controllable. In some embodiments, electrical systems are used with any other type of equipment/machine utilizing steering, braking, clutching, feedback control, and/or rotating components such as lawnmowers, tillers, conveyors, shakers, etc. Thus, the integrated stator disk devices and systems described herein can be incorporated into any suitable device or system for generating a variable torque or resistance.

Devices and/or systems described herein are configured to generate resistance in response to being energized by a magnetic field generated by a magnetic component of the device and/or system. In conventional, resistive torque-generating devices and/or systems having a single rotor there are only two shear areas (four shear surfaces) for generating resistance in response of a magnetic field. Devices, systems, and methods described herein are configured to generate at least twice as much resistance compared to conventional devices and/or systems, in part, because of the increased number of rotors coupled with one or more integrated stators.

To generate at least twice as much resistance, the devices and systems described herein include at least four shear areas (e.g., comprised of eight shear surfaces) to generate resistance. By increasing (e.g., at least doubling) the amount of resistance generated, the amount of on-state torque generated by a single device is also increased, without having to increase the power and/or the size or diameter of the device. As used herein, "diameter" is used to refer to device and/or system height and/or thickness. In other embodiments, devices and systems described herein include six shear areas (e.g., comprised of 12 shear surfaces) for generating even more resistance than devices and systems comprising four shear areas (e.g., comprised of eight shear surfaces).

In some embodiments, integrated stator disk devices and systems include at least one metallic and/or magnetic stator disk integrated with a non-metallic and/or non-metallic part. The part to which the stator disk(s) is integrated may include a plastic bobbin configured to hold a magnetic coil or winding. The magnetic coil or winding is configured to generate a magnetic field which is used to generate torque. The distance between pole piece(s) surrounding the bobbin and the stator are configured to remain at a specific range in order to avoid magnetic flux jumping. In other embodiments, integrated stator disk devices and systems may include a stator disk(s) incorporated into a portion of at least one bent rotor.

FIG. 1 is a perspective view of an exemplary integrated stator disk device, referred to herein as "device," generally designated device 100, which can be configured to generate torque within a resistive torque-generating device and/or system for braking applications, locking applications, clutching applications, steering applications, tactile feedback applications, or the like. Device 100 includes at least one stator disk 102 integrated with an electromagnetic coil 104 and/or a non-metallic member supporting the coil, such as a non-metallic bobbin 106. Overall sizing of device 100 is determined by a torque output required and space available for a torque-generating device. Device 100 may include any suitable size or diameter, including but not limited to a diameter between about 20 mm and about 80 mm Device 100 may be approximately 20 mm or more, approximately 40 mm or more, approximately 50 mm or more, or approximately 80 mm or more. Device 100 provides a resistive torque-generating system for capable of generating between about 2 Newton-meters (Nm) of torque to about 12 Nm of torque. Device 100 may provide about 2 Nm of torque or more, about 5 Nm of torque or more, about 8 Nm of torque or more, or about 12 Nm of torque or more.

As illustrated in FIG. 1, device 100 includes at least one stator disk 102. However, device 100 may use more than one stator disk 102 (e.g., multiple disks) may be used and integrated within for increasing a torque output (see, e.g., FIG. 12). Stator disk 102 may comprised of any suitable material, for example, any metal or metallic material (e.g., steel, iron (Fe), alloys thereof, etc.), a magnetic material, and/or any combinations thereof. In one embodiment, stator disk 102 is comprised of a soft magnetic alloy comprising iron.

In some embodiments, stator disk 102 may be formed from a stamping process. Stamping stator disk 102 results in a dimensionally reliable product, which is inexpensive to manufacture. Other suitable processes for producing stator disk 102 include fine blanking, laser cutting, casting, machining, forging, pressing, extruding, or the like.

Still referring to FIG. 1, coil 104 includes an electrically conductive material and/or electromagnetic material disposed about a non-conductive, non-metallic, and/or non-magnetic bobbin 106. For example, coil 104 may include any suitable length of a metallic winding 108 wrapped around a non-metallic bobbin 106. Preferably, coil 104 is comprised of an electromagnetic material, while bobbin 106 is comprised of a non-metallic material (e.g., plastic, polymeric, etc.). In some embodiments, coil 104 is configured to electrically power and energize a system incorporating stator disk 102 thereby providing a magnetic flux or field through a magnetic material to generate torque.

In some embodiments, bobbin 106 is formed as a spindle or cylinder having a perimeter about which winding 108 is coiled, wrapped, or wound about. Bobbin 106 is comprised of any suitable material, which includes a non-metallic plastic, polymeric, or ceramic material that is electrically insulating. In some embodiments, bobbin 106 is comprised of plastic that is injection molded about stator disk 102. For example, bobbin 106 may be formed via an injection molding process, such that the resulting bobbin 106 is a molded bobbin 106 having stator disk 102 integrated therein. Stator disk 102 may be used as an insert during injection molding, such that stator disk 102 is over-molded within a center of bobbin 106 to form a single, integrated component.

In some embodiments, bobbin 106 is over-molded about a previously stamped stator disk 102. As noted above, stamping provides a dimensionally stable and reliable disk that is inexpensive to manufacture. After over-molding bobbin 106 about stator disk 102, a single stator disk 102 is provided. Over-molding stator disk 102 does not negatively affect the effective diameter of a resistive torque-generating unit or system incorporating device 100, and therefore provides a high on-state torque level in a comparable envelope space.

In some embodiments, winding 108 is configured to generate a magnetic field upon being energized or electrically activated via an electrical current. Winding 108 may include an electromagnetic material configured to generate an electromagnetic field within a magnetic medium such as MR material to generate a torque or resistance that opposes the rotation of one or more rotors disposed within a resistive torque-generating device (see e.g., rotors 206, 208 and FIG. 6). A thin layer of potting material 110 may be disposed over an entirety or a substantial entirety of winding 108 for reducing vibration effects on winding 108 and/or for helping heat exchange with the adjacent components surrounding device 100.

In some embodiments, winding 108 is in electrical communication with an electrical unit (not shown). The electrical unit may include one or more sensors, switches, capacitors, signal conditioners, analog or digital circuitry, or the like for employing power and control algorithms, communications circuitry, as well as any other circuitry and like components. At least one wire 112 is configured to run from at least one exterior face of bobbin 106 for supplying electrical current from the electrical unit to winding 108 for powering, energizing, and/or otherwise electrically activating the winding.

FIGS. 2A-2B, 3A-3B, and 4A-4B illustrate exemplary embodiments of stator disks 102A, 102B, and 102C configured for integration within one or more single, respective stator disk devices.

Figure 2A:
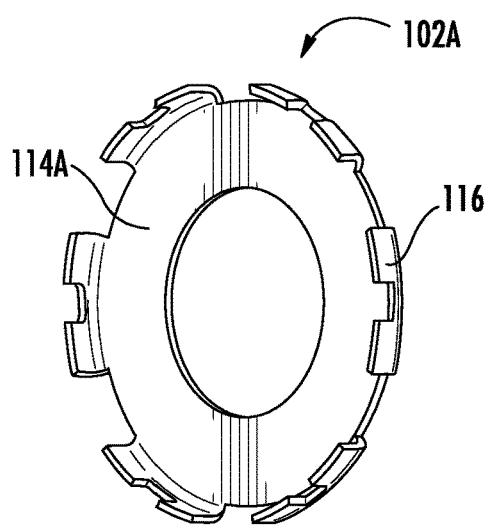
FIG. 2A is a perspective view of a stator disk.

Referring to FIG. 2A, stator disk 102A is illustrated with a substantially planar disk body 114A and one or more flanges 116 disposed along a periphery of planar disk body 114A and extending from a front face of planar disk body 114A. When stator disk 102A has two or more flanges 116, the flanges 116 may have intervals that are equidistant and/or non-equidistant. In alternative embodiments, each flange 116 can be angled with respect to planar disk body 114A or each flange 116 can be orthogonally disposed at a substantially right angle with respect to planar disk body 114A. Stator disk 102A can include shaped flanges 116 that are formed or shaped. Shaped stator disks (e.g., 102A, 102B, 102C) include an increased surface area available for over-molding within plastic (e.g., bobbin, 106A, 106B) to improve the retention within an integrated device.

Figure 2B:
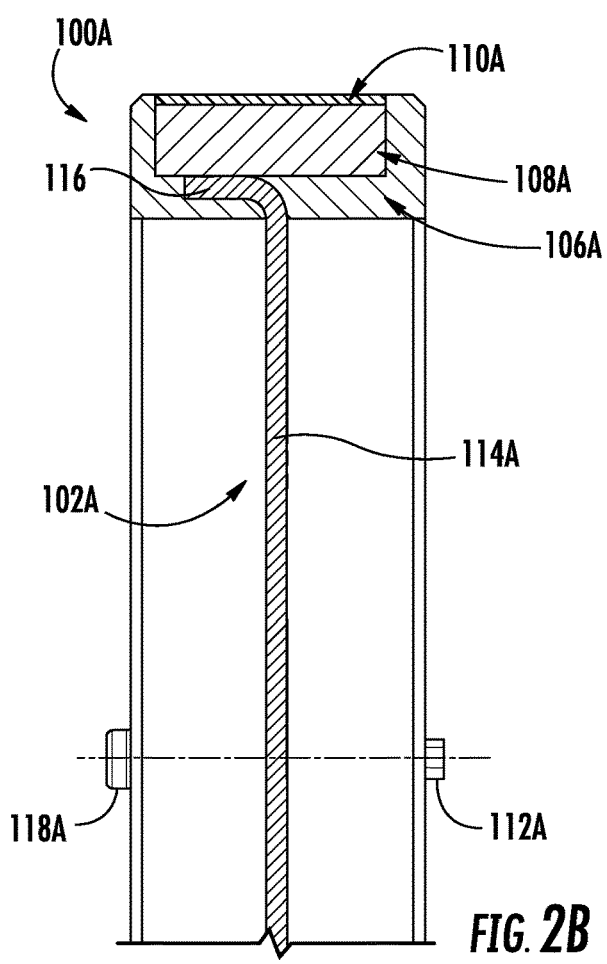
FIG. 2B is a cross-sectional view of the stator disk device, featuring the stator disk of FIG. 2A.

FIG. 2B is a sectional view of stator disk 102A, portions of which are integrated with and/or over-molded within plastic. In this embodiment, stator disk 102A is integrated with bobbin 106A of device 100A. As illustrated in FIG. 2B, flanges 116 of stator disk 102A are shaped (e.g., bent or curved) towards one side of bobbin 106A and creating resistance thereby preventing stator disk 102A from rotating within bobbin 106A during molding and/or after stator disk 102A is integrated into the bobbin. In some embodiments, flanges 116 of stator disk 102A are parallel to and/or in contact with winding 108A while planar disk body 114A of stator disk 102A is substantially perpendicular to winding 108A.

In the embodiment illustrated in FIGS. 2A and 2B, at least one retaining member 118A is disposed on the exterior face of bobbin 106A. The at least one retaining member 118A is configured to affix and/or secure at least one pole piece 202 onto bobbin 106A. Bobbin 106A has one or more electrical wires 112A disposed on its exterior face. Retaining member 118A and one or more electrical wires 112A may be disposed on opposing exterior face or faces of bobbin 106A. In an alternative embodiment, bobbin 106A has an additional retaining member 118A is disposed on an opposing exterior face or faces.

Figure 3A:
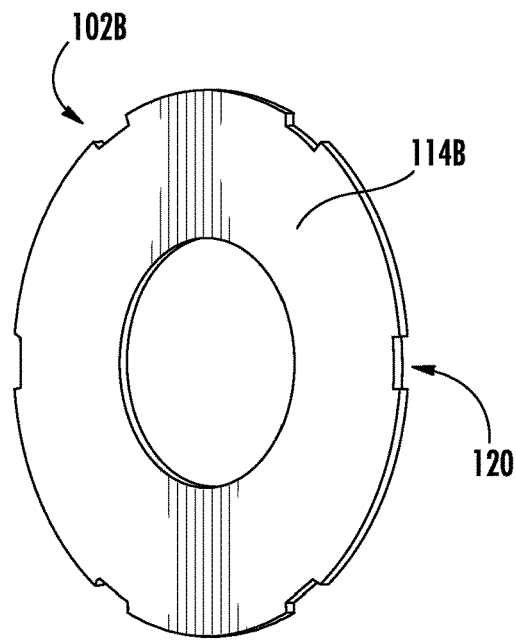
FIG. 3A is a perspective view of a further embodiment of a stator disk.
Figure 3B:
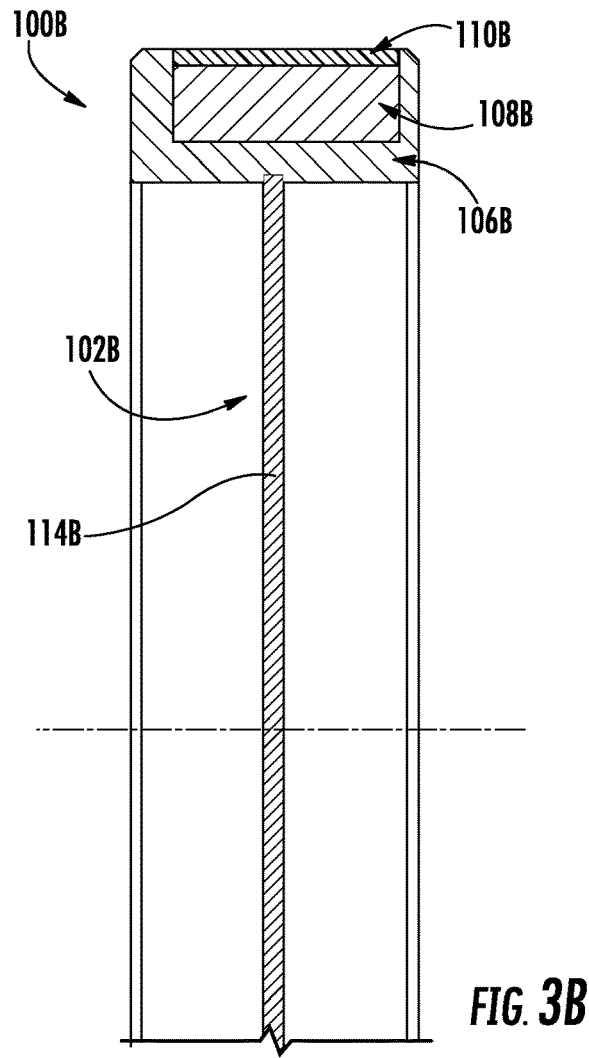
FIG. 3B is a sectional view of embodiment of the stator disk device, featuring the stator disk of FIG. 3A.

Referring to FIGS. 3A and 3B, a second embodiment of stator disk 102 is illustrated. As illustrated in FIG. 3A, stator disk 102B has a planar disk body 114B and a series of cutouts 120 disposed along or about a periphery of planar disk body 114B. When stator disk 102B has two or more cutouts 120, the cutouts 120 are disposed at equal and/or unequal distances about the periphery of disk body 114B. In alternate embodiments, cutouts 120 may have different sizes, shapes, interval spacing. For example, cutouts 120 having an increased depth may be used.

FIG. 3B is a sectional view of a stator disk 102B from FIG. 3A, that is integrated with a non-metallic material to form a single integrated component. In some embodiments, stator disk 102B is incorporated into a bobbin 106B of device 100B. As described above, in some embodiments, stator disk 102B is injection molded within a plastic bobbin 106B. As illustrated in FIG. 3B, cutouts 120 of stator disk 102B result in a substantially 'straight' or planar stator disk 102B cross-section. Although cutouts 120 differ in geometry to flanges 116 of the previous embodiment, which curve within bobbin 106A, cutouts 120 also provide a resistance to prevent stator disk 102B from rotating within bobbin 106B during or after molding. As illustrated in FIG. 3B, stator disk 102B is substantially perpendicular to winding 108B and is separated from winding 108B by a specified distance. In a non-limiting example, the specified distance is about 0.5 millimeters. Non-cutout portions of stator disk 102B are over-molded in bobbin 106B, while stator disk 102B does not come into contact with winding 108B.

Figure 4A:
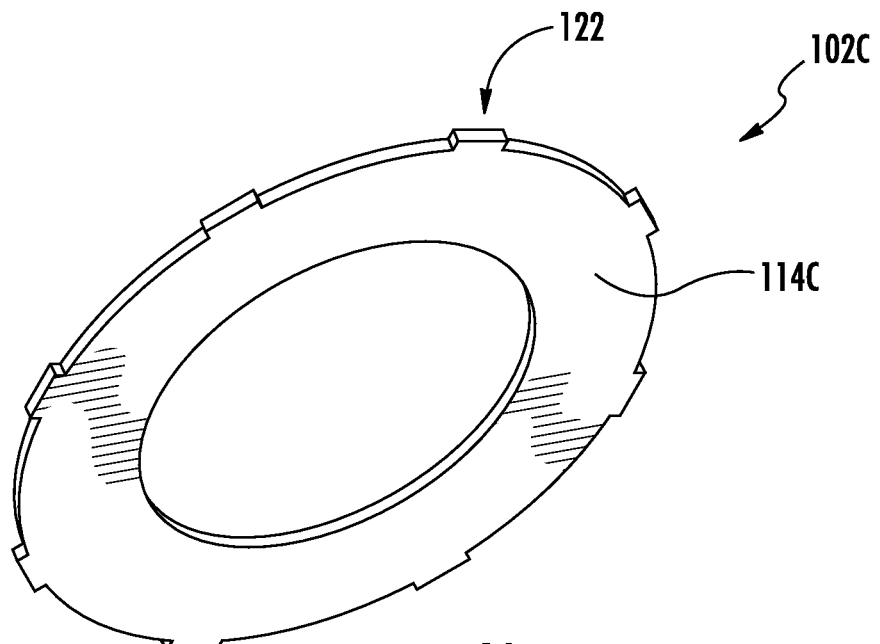
FIG. 4A is a perspective view of a further embodiment of an exemplary stator disk.
Figure 4B:
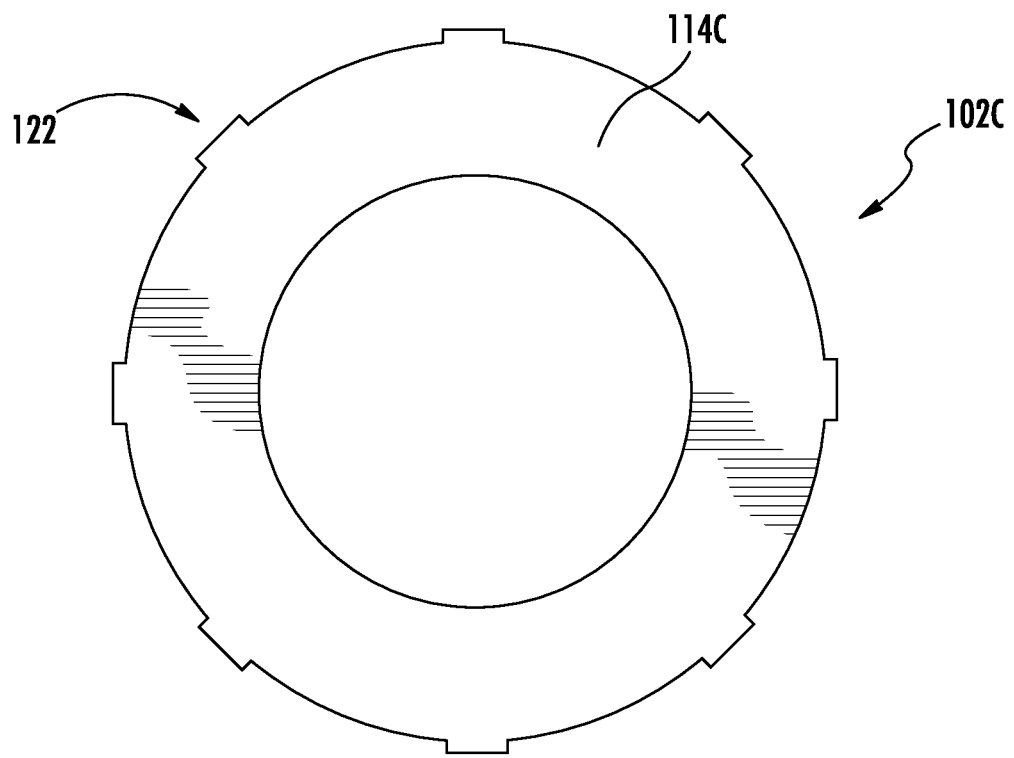
FIG. 4B is a plan view of the stator disk of FIG. 4A.

Referring to FIGS. 4A-4B, a third embodiment of stator disk 102 is illustrated. As shown, stator disk 102C includes a planar disk body 114C and a series of notches 122 disposed along or about a periphery of planar disk body 114C. In comparison with cutouts 120 illustrated in FIGS. 3A-3B of stator disk 102B, notches 122 of stator disk 102 C extend outward from a periphery of disk body 114C. As shown in FIG. 4A, stator disk 102C has eight notches 122 disposed about the periphery of disk body 114C. Notches 122 may be disposed about the periphery of disk body 114C at equal and/or unequal distances. Alternatively, more or less notches having different sizes, shapes, or interval spacing may be provided. For example, notches 122 having an increased width and/or length may be used. Accordingly, when integrated into a bobbin of a device (e.g., 100, FIG. 1), stator disk 102C comprises a substantially 'straight' or planar cross-section with notches 122 acting to provide resistance to prevent stator disk 102C from rotating within the bobbin.

In alternative embodiments, any size and/or shape of stator disks may be provided. For example, in some embodiments, substantially "T" shaped stator disks (not shown) or other shaped (e.g., notching, cutting, bending, etc.) stator disks may be provided and integrated within a non-metallic material, such as a plastic bobbin and/or one or more rotor.

Figure 5A:
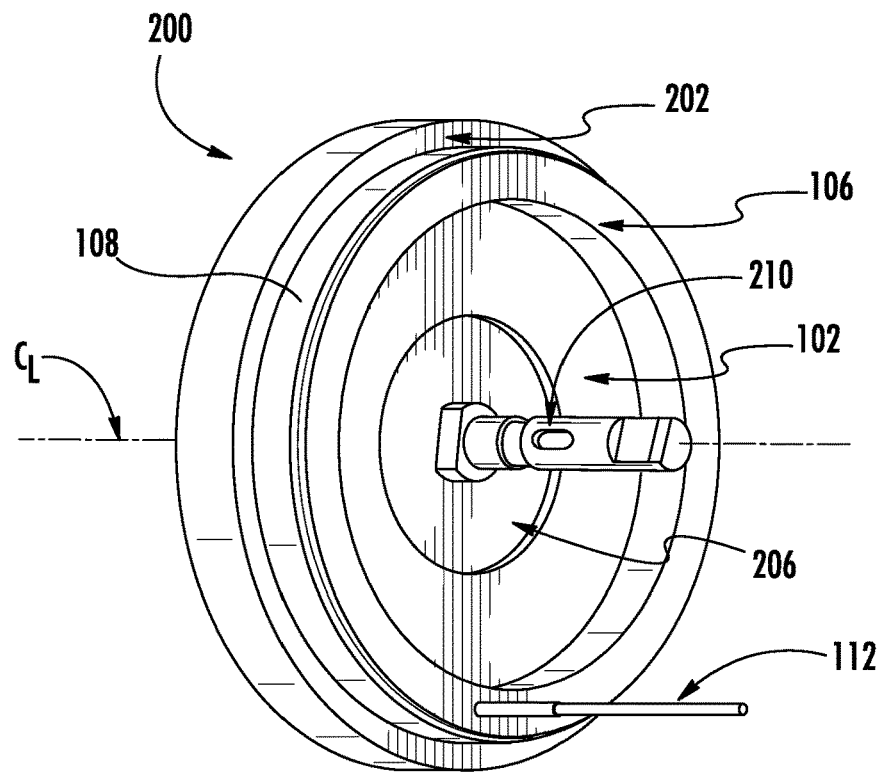
FIG. 5A is a perspective view of an exemplary integrated stator disk system including straight rotor(s)
Figure 5B:
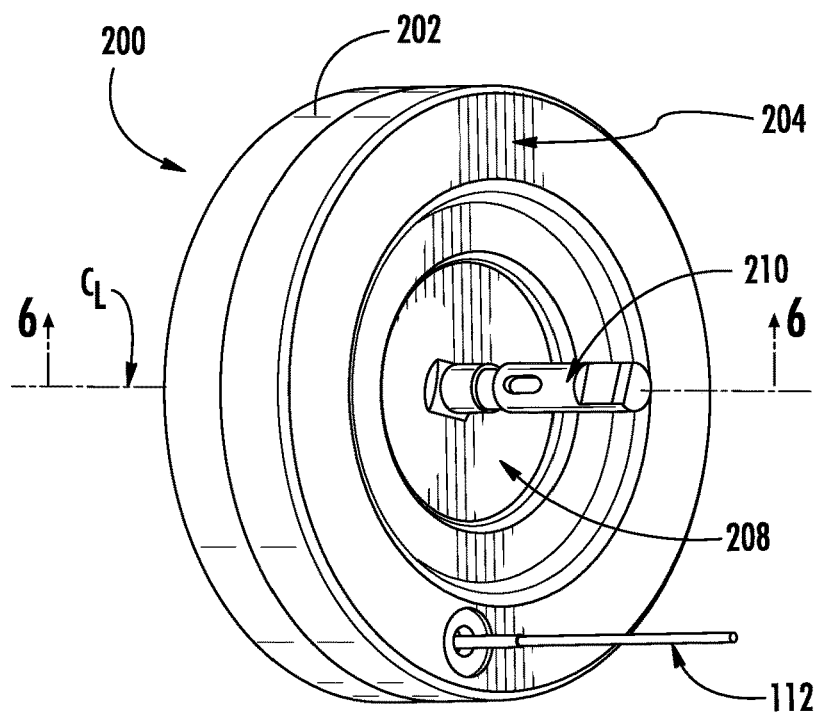
FIG. 5B is a perspective view of the exemplary integrated stator disk system of FIG. 5A.
Figure 6:
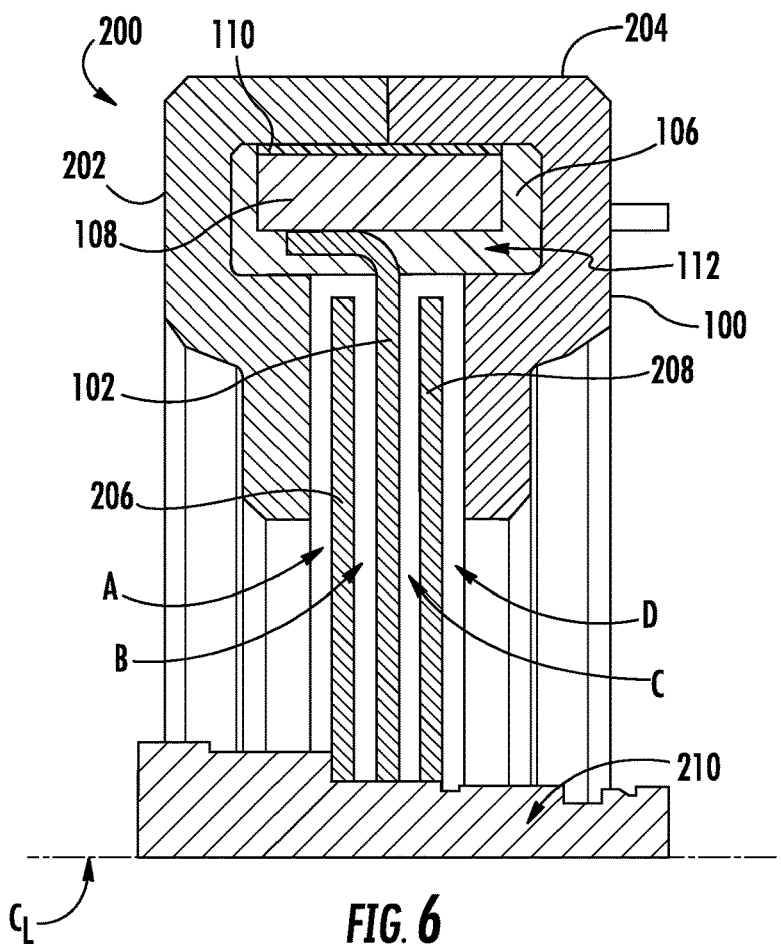
FIG. 6 is a sectional view of an integrated stator disk system including the stator disk of FIG. 2A taken along line 6-6 of FIG. 5B according to one embodiment of the subject matter described herein.

Referring to FIGS. 5A-6, an exemplary embodiment of an integrated stator disk system 200 for torque generation is illustrated. As illustrated, system 200 comprises a resistive torque-generating device or system. System 200 generates torque for any suitable application, not limited to braking applications, locking applications, clutching applications, feedback applications, or the like. System 200 may be used within vehicles, fitness equipment, power equipment (e.g., lawnmowers, etc.) or any other suitable component.

In some embodiments, system 200 is used within a braking device, such as an MR braking device. As illustrated in FIGS. 5A-6, system 200 includes an integrated stator disk device similar to those discussed above. As shown, system 200 is disposed within a housing configured to enclose or house one or more rotating components, non-rotating components, and MR material that collectively operate to generate a variable torque or resistance to rotation. The variable torque that is generated is transmitted to a steering component (e.g., a steering wheel) via a shaft for use in steer-by-wire or tactile feedback applications, drive wheels for clutching, braking or locking applications, and/or any other components associated with rotating machinery. In some embodiments, system 200 is configured to generate a variable torque for providing tactile/sensory feedback for use in non-mechanical (e.g., steer-by-wire) steering applications.

As illustrated in FIGS. 5A-6, system 200 includes an integrated stator disk 102 comprising a stator disk 102 integrated within a bobbin 106, a first pole piece 202, a second pole piece 204, and one or more rotors. In an alternative embodiment, system 200 includes a first rotor 206 and a second rotor 208 disposed on opposing sides or surfaces of disk 102. In other alternative embodiments, where an even further increase in torque generation is desired, system 200 may include n rotors and n−1 stator disks. Increasing the number of rotors and stator disks provides for an increase in an amount of torque generated by system 200.

In some embodiments, pole pieces 202 and 204 may comprise two separate components. Pole pieces 202 and 204 provide for flux conveyance from the coil to rotors 206 and 208. Surrounding rotors 206 and 208 is MR material. As illustrated, pole pieces 202 and 204 are separated from the rotors 206 and 208, and they do not touch. Pole pieces 202 and 204 are part of the static components of the system.

In some embodiments, first rotor 206 and second rotor 208 are configured to rotate relative to pole pieces 202 and 204 via a shaft 210 thereby providing a compact dual rotor device configured to increase or improve torque generation. More particularly, rotors 206 and 208 may both be activated via an electrical current.

In some embodiments, rotors 206 and 208 include any suitable material, for example, any metal or metallic material (e.g., Al, steel, Fe, alloys thereof, or the like), a magnetic material and/or combinations thereof. Preferably, rotors 206, 208 include a soft magnetic alloy containing Fe. As illustrated in FIG. 6, shaft 210 extends through system 200 and connects to portions of rotors 206 and 208 for providing rotation thereof. In the embodiment illustrated, rotors 206 and 208 rotate about a centerline $C_L$ of shaft 210, which coincides with a centerline of system 200. Shaft 210 includes a solid or hollow component having any suitable length for use in a variety of steering (e.g., steer-by-wire) and/or braking or clutching applications.

Referring to FIG. 6, the configuration of pole pieces 202 and 204, rotors 206,208, and device 100 result in additional shear surfaces in shear areas A, B, C and D available to generate torque, where the additional shear surfaces increase friction in a zone where a magnetic field may be applied, and therefore, significantly increases maximum achievable on-state torque. Increasing maximum achievable on-state torque is achieved without having to significantly increase a size or diameter of system 200, for example, by simply configuring system 200 in the manner illustrated in FIG. 6, where stator disk 102 is integrated into bobbin 106 rather than being disposed directly between pole pieces 202 and 204. As illustrated, stator disk 102 is configured to fixedly attach to pole pieces 202 and 204, such that a distance between pole pieces 202 and 204 and stator disk 102 remain at a specific range to avoid flux jumping.

FIG. 5A is a perspective view of system 200 including a stator disk device 100 fixed within first pole piece 202. FIG. 5B illustrates a perspective view of system 200 including a stator disk 102 fixed within both first pole piece 202 and second pole piece 204. In FIG. 5B, pole pieces 202 and 204 are configured to be a built-in environment for device 100, such that device 100 is fixed within pole pieces 202 and 204, and stator disk 102 and pole pieces 202 and 204 are not rotatable relative to one another.

Based on the configuration of resistive torque-generating system 200 provided in FIG. 6, gaps between rotors 206 and 208, surfaces of bobbin 106, and surfaces of stator disk 102 define multiple separate shear areas A, B, C and D, each having two shear surfaces. In some aspects, more than two, three, four or more shear areas are provided. As illustrated, a first shear area A is positioned between a surface of pole piece 202, one or more portions of bobbin 106 and a first surface of a first rotor 206. A second shear area B is positioned between a first surface of stator disk 102 and a second, opposing surface of first rotor 206. A third shear area C is positioned formed between a second, opposing surface of stator disk 102 and a first surface of a second rotor 208. A fourth shear area D is positioned between a surface pole piece 204, one or more portions of bobbin 106 and a second, opposing surface of second rotor 208. In this embodiment, resistance is generated via at least eight shear surfaces.

Still referring to FIG. 6, first rotor 206, second rotor 208 and coil 104 collectively are configured to generate a magnetic field. Coil 104 generates and conveys the magnetic field or flux path, through a quantity of MR material for generating a variable torque that opposes the two or more rotors 206 and 208. In some embodiments, MR material (not shown) is disposed about portions of rotor 206 and 208, for example, on opposing sides and all around rotor 206 and 208, such that MR material may be disposed proximate the gaps between pole pieces 202 and 204, bobbin 106, and rotors 206 and 208 that define the plurality of shear areas. MR material may also be in contact with stator disk 102. Referring to FIG. 6, MR material is positioned at least in the shear areas A, B, C and D. These shear areas are the magnetic gaps. MR material may also be found in other areas but its presence is a consequence of the assembly, filling process.

In some embodiments, MR material includes any material that is responsive to and/or actuated by a magnetic field. MR material may include soft-magnetic or magnetizable particles dispersed within a carrier material or medium such as a liquid or gas. In some embodiments, MR material includes a dry MR powder including magnetizable particles that are not dispersed within a liquid or oil carrier. The magnetizable particles of material may include carbonyl iron, stainless steel, and/or any other magnetic material having various shapes, not limited to a spherical shape. MR material may include an MR powder having magnetizable particles of any suitable size, for example, particles having a mean diameter of approximately 0.1 µm to approximately 500 µm, and any size(s) and/or range of size(s) therebetween. In some embodiments, MR material is any soft-magnetic, magnetic, or magnetizable material readily commercially available such as that found in various formulations from LORD Corporation of Cary, N.C. In some embodiments, the MR material is a MR fluid Referring now to FIGS. 7-10B, an exemplary embodiment of an integrated stator disk system, generally designated 300, for torque generation is illustrated. In comparison, with system 200 illustrated in FIGS. 5A-6, system 300 comprises at least one bent rotor that is axially fixed with regard to a diameter of system 300. In this manner, more than one rotor is included in the system, which increases torque generation, while still respecting the strict space constraints within the system.

In some embodiments, system 300 is used within a braking device, such as an MR braking device. System 300 includes an integrated stator disk device, such as illustrated in FIGS. 1-4B, and at least one bent rotor. System 300 is disposed within a housing configured to enclose or house one or more rotating components, non-rotating components, and MR material that collectively operate to generate a variable torque or resistance to rotation. In some embodiments, the variable torque that is generated is transmitted to a steering component (e.g., a steering wheel) via a shaft for use in steer-by-wire or tactile feedback applications, drive wheels for clutching or braking applications, and/or any other components associated with rotating machinery. In some embodiments, system 300 is configured to generate a variable torque for providing tactile/sensory feedback for use in non-mechanical (e.g., steer-by-wire) steering applications.

As illustrated in FIGS. 7 and 9A-10B, system 300 includes a first pole piece 302 and a second pole piece 304 positioned proximate a stator disk device and centered about a shaft 306. At least one rotor 310 is disposed proximate both first pole piece 302 and second pole piece 304 and is configured to rotate about shaft 306. For example, there may be two rotors disposed on opposing sides of a stator disk within first pole piece 302 and second pole piece 304. In some embodiments, where space within the enclosure housing first pole piece 302 and second pole piece 304 is limited, it is desirable to fix rotors and/or stator in an axial position relative to a center, designated by centerline $C_L$, of system 300. In this manner, system 300 may include at least one rotor 310 bent relative to a center in order to meet certain diameter requirements of system 300.

Figure 7:
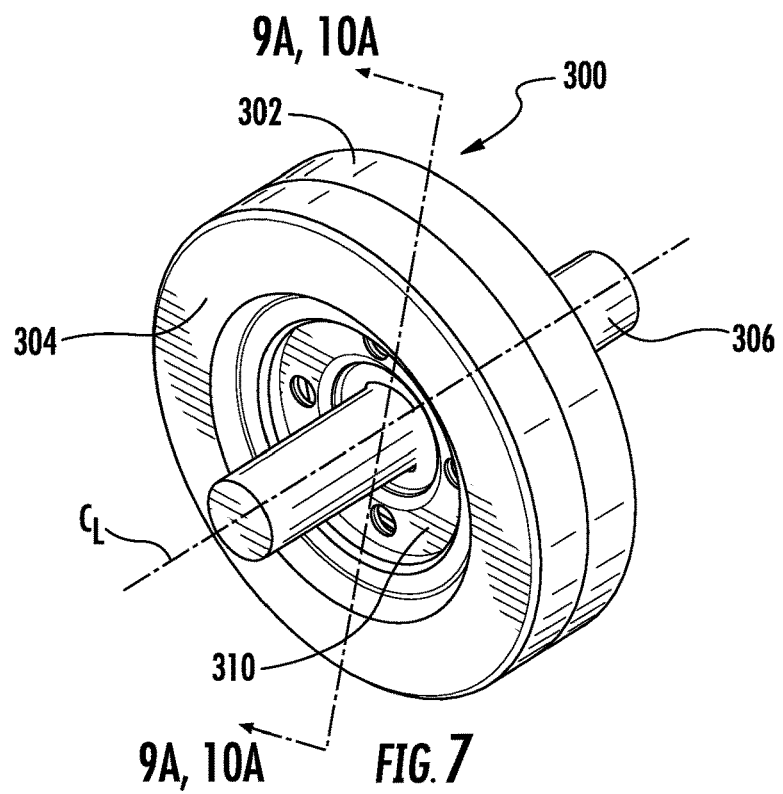
FIG. 7 is a perspective view of an exemplary integrated stator disk system including two bent rotors.
Figure 8A:
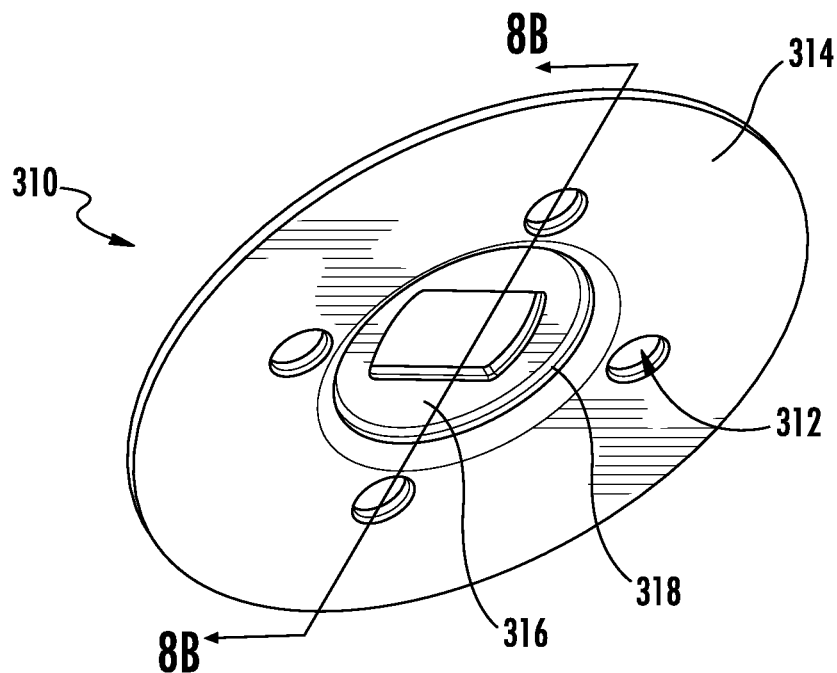
FIG. 8A is a perspective view of an exemplary rotor.
Figure 8B:
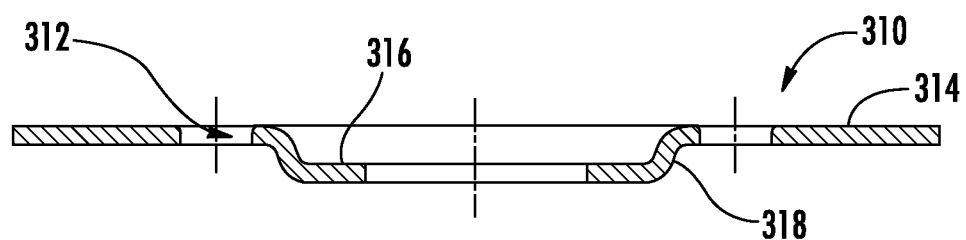
FIG. 8B is a cross-sectional view taken along line 8B-8B of the rotor in FIG. 8A.

Referring to FIGS. 8A-8B, one embodiment of at least one bent rotor 310 is illustrated. In some embodiments, at least one rotor 310 includes a plurality of holes 312 disposed on a top surface 314 of the rotor. For example, and as illustrated in FIGS. 7-8A there are four holes 312 disposed substantially equidistant and extending through top surface 314 of rotor 310. The plurality of holes 312 are provided to reduce the weight and inertia of the at least one bent rotor 310 and help distribution of MR material inside the device. In some embodiments, there are more holes or there are fewer holes 312 that are of a different in size, shape, disposition, etc.

In some embodiments, and as illustrated in FIG. 8B, top surface 314 of at least one bent rotor 310 is substantially circular in shape and transitions to a bottom surface 316 that is also substantially circular in shape. A central hole through which shaft 306 (see, e.g., FIG. 7) extends and/or connects to at least one bent rotor 310 for providing rotation thereof is disposed on bottom surface 316. Top surface 314 and bottom surface 316 are substantially parallel to one another and are offset by a bend or bent transition, generally designated 318. Bend 318 is configured to provide for compactness of at least one bent rotor 310. As illustrated in FIGS. 8A-8B, bend 318 is configured to transition top surface 314 to bottom surface 316 so that bottom surface 316 is at a plane lower than top surface 314. Where there is more than one bent rotor 310, such as rotors 310A, 310B of FIG. 9A, each of at least one bent rotor 310 is configured to be disposed relative to one another so that bends 318 are relatively disposed in a 'spooning' or coincident position.

As described above relative to rotors 206, 208 in FIG. 6, at least one bent rotor 310 includes any of the same suitable materials, for example, any metal or metallic material (e.g., Al, steel, Fe, alloys thereof, or the like.), a magnetic material and/or combinations thereof. Preferably, at least one bent rotor 310 includes a soft magnetic alloy containing Fe. In some embodiments, at least one bent rotor 310 rotates about a centerline $C_L$ of shaft 306, which coincides with a centerline of system 300. Shaft 306 includes a solid or hollow component having any suitable length for use in a variety of steering (e.g., steer-by-wire) and/or braking or clutching applications.

Figure 9A:
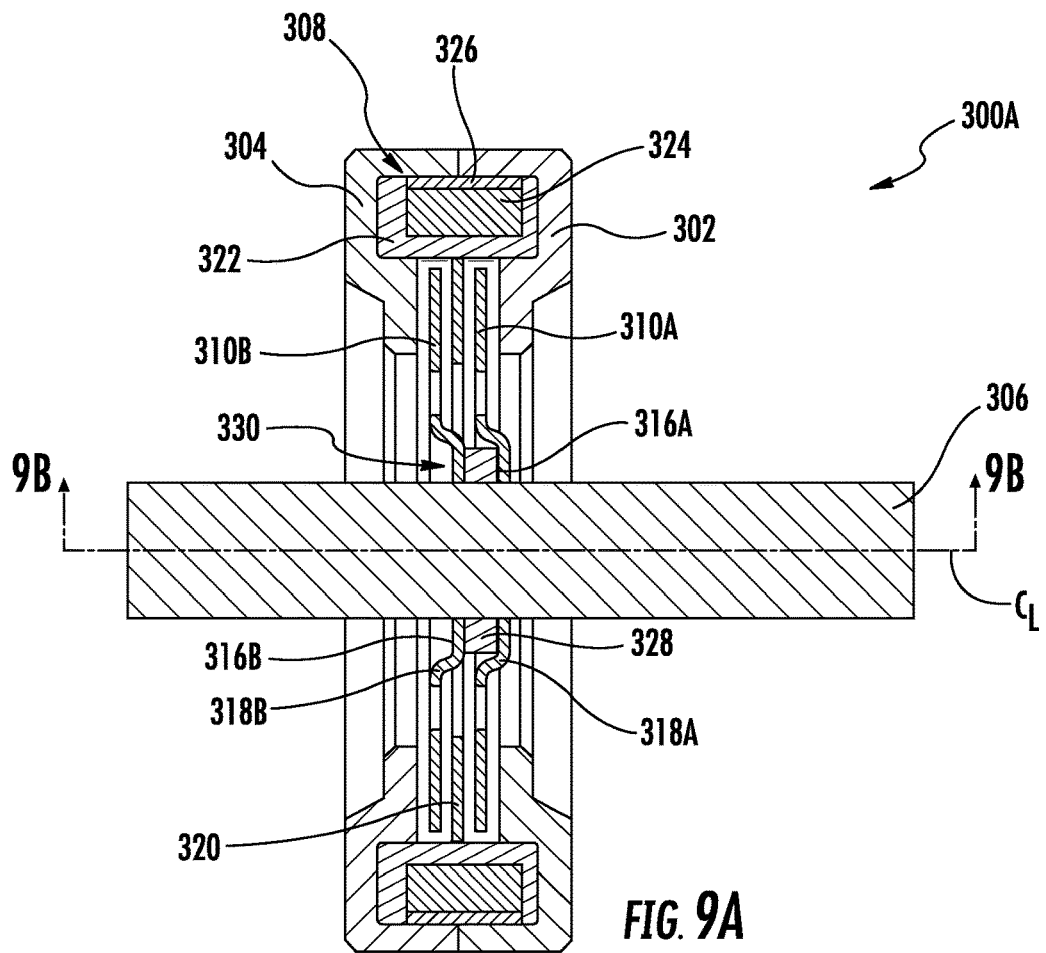
FIG. 9A is a cross-sectional view taken along line 9A-9A of the integrated stator disk system in FIG. 7 and includes two bent rotors with a spacer ring.

FIG. 9A illustrates a system generally designated 300A. Like system 300 illustrated in FIG. 7, system 300A includes first pole piece 302 and second pole piece 304 proximate a stator disk 320, a shaft 306 extending therethrough, and a coil 308 for generating a magnetic field resulting in the generation of torque. System 300A also includes two bent rotors 310A and 310B with a stator disk 320 sandwiched therebetween. More particularly, rotors 310A, 310B may both be activated via an electrical current, although one rotor may increase in rotation and/or torque generation proportionally with regard to the other rotor.

As illustrated in FIG. 9A, first bent rotor 310A is proximate first pole 302 and second bent rotor 310B is proximate second pole 304. Shaft 306 extends through a center of first bent rotor 310A, stator disk 320, and second bent rotor 310B, such that a centerline $C_L$ (corresponding to section line 9B-9B) of shaft 306 corresponds to a centerline $C_L$ of system 300A. Each of bent rotors 310A, 310B includes a bend as described above with regard to FIGS. 8A-8B. For example, first bent rotor 310A includes a bend 318A and second bent rotor 310B includes a bend 318B, each of the bends 318A, 318B being disposed close to shaft 306 with bottom surfaces 316A, 316B of each rotor facing in the same direction.

Figure 9B:
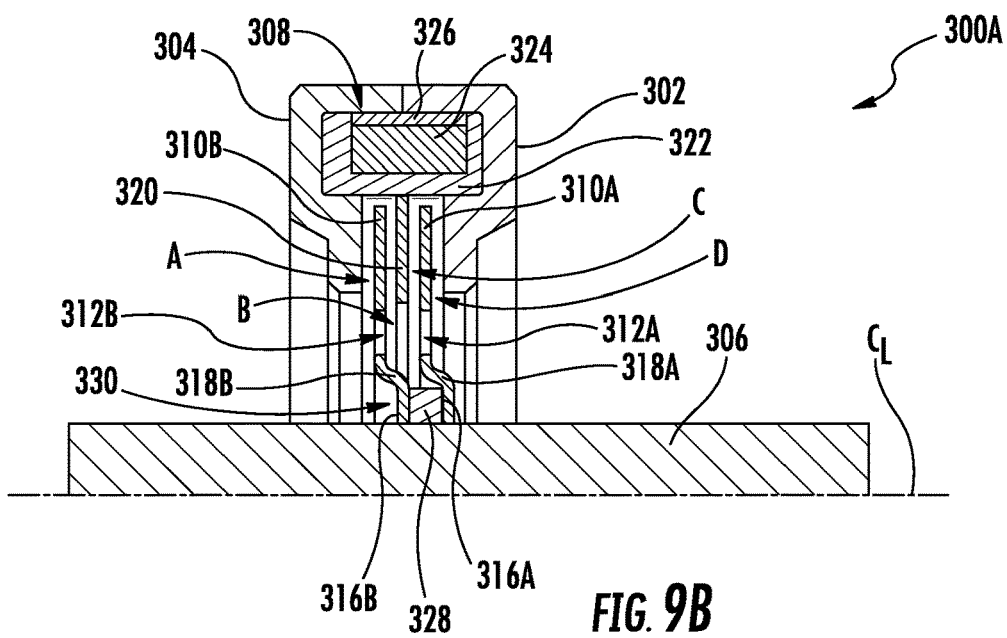
FIG. 9B is a cross-sectional view taken along line 9B-9B of FIG. 9A and includes two bent rotors with a spacer ring.

Referring to FIGS. 9A and 9B, stator disk 320 separates first bent rotor 310A and second bent rotor 310B. As illustrated in FIG. 9A, stator disk 320 is formed such that it results in a substantially 'straight' or planar stator disk 320 cross-section that is perpendicular to coil 308 and that is integrated with a bobbin 322. In particular, stator disk 320 separates a top portion of bends 318A, 318B. In such a manner, stator disk 320 is not in contact with either first bent rotor 310A or second bent rotor 310B, and is separated by a shear area (i.e., B and C, FIG. 9B).

In further embodiments, stator disk 320 is shaped, sized, etc., like the stator disk described in FIG. 3B. For example, stator disk 320 is integrated with a non-metallic material to form a single integrated component. As illustrated in FIG. 9A, stator disk 320 is incorporated (e.g., injection molded within) a plastic bobbin 322, such that stator disk 320 is configured to provide a resistance to prevent stator disk 320 from rotating within bobbin 322 during or after molding. In this manner, stator disk 320 is perpendicular to winding 324 and/or potting 326 and is separated from winding 324 by a specified range.

As discussed above with regard to FIG. 1, bobbin 322 comprises a non-conductive, non-metallic, and/or non-magnetic material about which an electrically conductive material and/or electromagnetic material of coil 308 is disposed. For example, coil 308 includes any suitable length of metallic winding 324 wrapped around a non-metallic bobbin 322. Preferably, coil 308 comprises an electromagnetic material, while bobbin 322 comprises a non-metallic material (e.g., plastic, polymeric, etc.). In some embodiments, coil 308 is configured to electrically power and energize a system incorporating integrated stator disk 320 thereby providing a magnetic flux or field through a magnetic material to generate torque.

In some embodiments, bobbin 322 is formed as a spindle or cylinder having a perimeter about which winding 324 is coiled, wrapped, or wound about. Bobbin 322 includes any suitable material such as a non-metallic plastic, polymeric, or ceramic material that is electrically insulating. Winding 324 is configured to generate a magnetic field upon being energized or electrically activated via an electrical current. Winding 324 includes an electromagnetic material configured to generate an electromagnetic field within a magnetic medium (e.g., MR material) to generate a torque or resistance that opposes the rotation of first and second bent rotors 310A, 310B. A thin layer of potting material 326 is disposed over an entirety or a substantial entirety of winding 324 for reducing vibrations resulting from the energized and/or electrically activated winding 324 and/or for preventing electrical current from spreading into adjacent components surrounding system 300A.

In some embodiments, winding 324 is in electrical communication with an electrical unit (not shown) that may include one or more sensors, switches, capacitors, signal conditioners, analog or digital circuitry, or the like for employing power and control algorithms, communications circuitry, as well as any other circuitry and like components. At least one wire (not shown) is configured to run from at least one exterior face of bobbin 322 for supplying electrical current from the electrical unit (not shown) to winding 324 for powering, energizing, and/or otherwise electrically activating the winding 324.

In some embodiments, and as illustrated in FIGS. 9A-9B, first bent rotor 310A is separated from second bent rotor 310B by a spacer ring 328. In some embodiments, and as illustrated in FIG. 9B, spacer ring 328 is a ring disposed substantially adjacent to shaft 306. In some aspects, spacer ring 328 is sized to fit within bend 318A of first bent rotor 310A. As illustrated, a top surface of spacer ring 328 is in contact with a bottom surface 316A of first bent rotor 310A. In some embodiments, spacer ring 328 is composed of a material suitable to ensure that first bent rotor 310A is spaced apart from stator disk 320 a certain distance. In one non-limiting example, spacer ring 328 is a ring having a thickness of approximately two millimeters to five millimeters, depending on a variety of factors, e.g., stator disk thickness, device size, etc. In some aspects, it is desirable that spacer ring 328 have a diameter of approximately three millimeters, due to the diameter constraints in device 300A. Other diameters and thicknesses of spacer ring 328 are contemplated and dependent upon the size of first bent rotor 310A and second bent rotor 310B and the system performance desired. As illustrated, spacer ring 328 is able to fixedly space first bent rotor 310A from stator disk 320 in order to guarantee a certain, fixed range between the two, and thereby maintain a fixed range between stator disk 320 and bobbin 322 in order to avoid magnetic flux jumping. First bent rotor 310A and second bent rotor 310B may be oppositely oriented from that illustrated in FIGS. 9A and 9B such that spacer ring 328 fits within bend 318B.

In some embodiments, second bent rotor 310B is shaped such that a space formed, the space being generally designated space 330, disposed between bottom surface 316B and an interior surface of second pole 304. Space 330 is a space of similar size to that occupied by spacer ring 328. In other aspects, a generic fastening device (not shown), such as a nut, lock washer, etc., is disposed within space 330 in order to axially fix second bent rotor 310B in a specific position. For example, an approximately four millimeter thick hexagonal nut is disposable around shaft 306 and adjacent to bottom surface 316B of second bent rotor 310B. However, any type of arrangement may be used in order to retain rotors in the desired position.

Accordingly, and based on the configuration of resistive torque-generating system 300A provided in FIG. 9B, gaps between poles 302, 304, rotors 310A and 310B, one or more portions of bobbin 322, and surfaces of stator disk 320 define multiple separate shear areas, each having two shear surfaces. In some aspects, more than two shear areas are provided, more than three shear areas are provided, or four or more shear areas are provided. For example, a first shear area A may be formed between one or more portions of bobbin 322, an interior surface of second pole 304 and a first surface of second bent rotor 310B. A second shear area B may be formed between a first surface of stator disk 320 and a second, opposing surface of second bent rotor 310B. A third shear area C may be formed between a second, opposing surface of stator disk 320 and a first surface of first bent rotor 310A. A fourth shear area D may be formed between one or more portions of bobbin 322, an interior surface of first pole 302 and a second, opposing surface of first bent rotor 310A. Thus, resistance is generated via contact with at least eight shear surfaces.

Figure 10A:
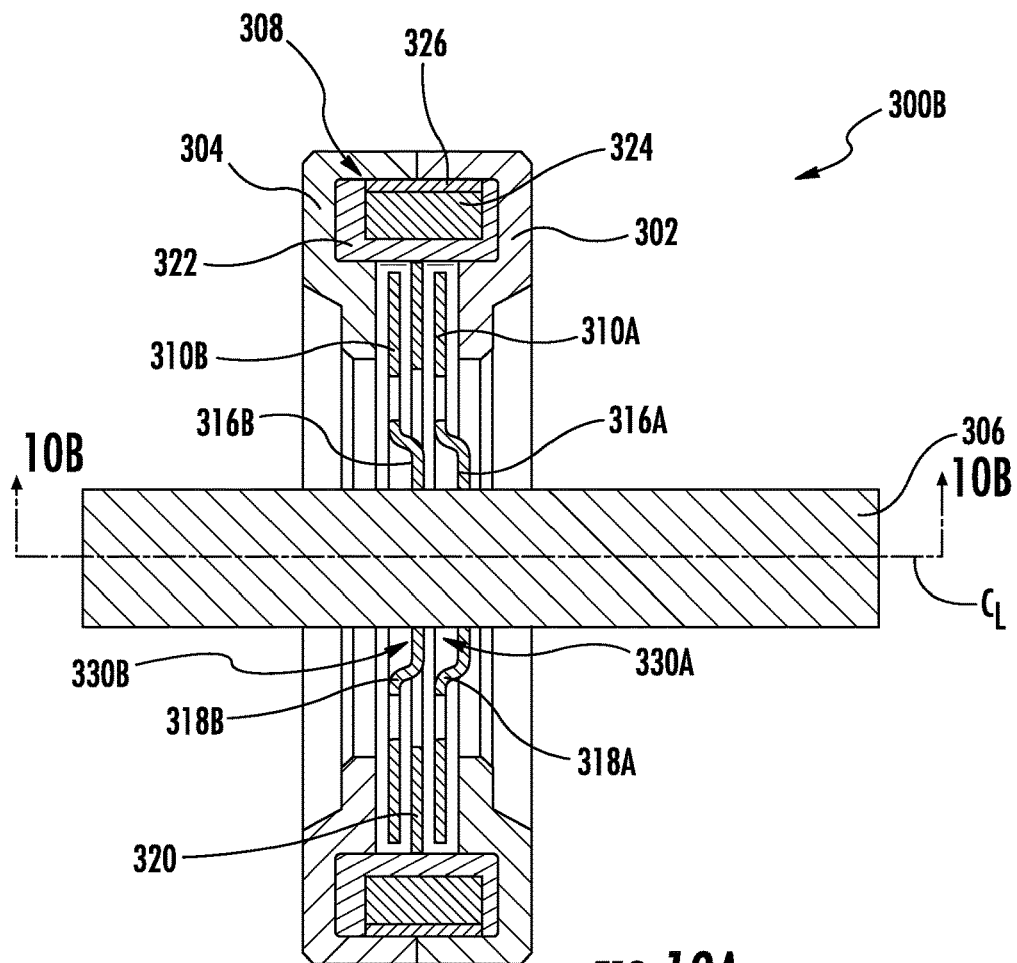
FIG. 10A is a cross-sectional view taken along line 10A-10A of the integrated stator disk system in FIG. 7 of and includes two bent rotors without a spacer ring.
Figure 10B:
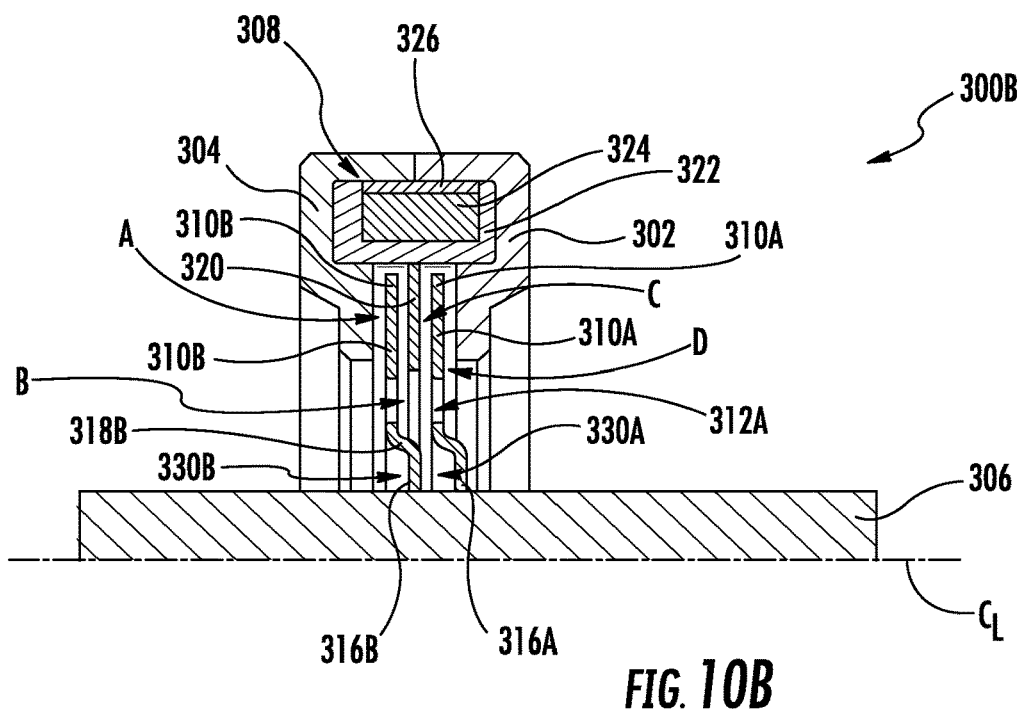
FIG. 10B is a cross-sectional view taken along line 10B-10B of FIG. 10A and includes two bent rotors without a spacer ring.

Referring now to FIGS. 10A-10B, another embodiment of system 300 is illustrated, generally referred to as system 300B. System 300B is similar to system 300A, however, there is no spacer ring 328. Instead, there are two spaces 330A and 330B provided, where space 330A is formed between bottom surface 316A of first bent rotor 310A and the second opposing surface of stator disk 320, and space 330B is formed between bottom surface 316B of second bent rotor 310B and an interior surface of second pole 304. In this manner, first and second bent rotors 310A, 310B are configured to be fixedly spaced apart from one another in an axial direction, without needing a fastening element and/or a spacer ring (e.g., 328, FIGS. 9A-9B). However, it is understood that one or more fastening elements and/or spacer rings may be provided in system 300.

In embodiments similar to those illustrated in FIGS. 9A-10B, stator disk 320 is omitted (not shown). In these embodiments, the first bent rotor 310A and the second bent rotor 310B are disposed between the first and second poles 302, 304. Magnetically responsive material is disposed about at least a portion of the first bent rotor 310A and the second bent rotor 310B. as well as being disposed between the first and second poles 302, 304.

Figure 11:
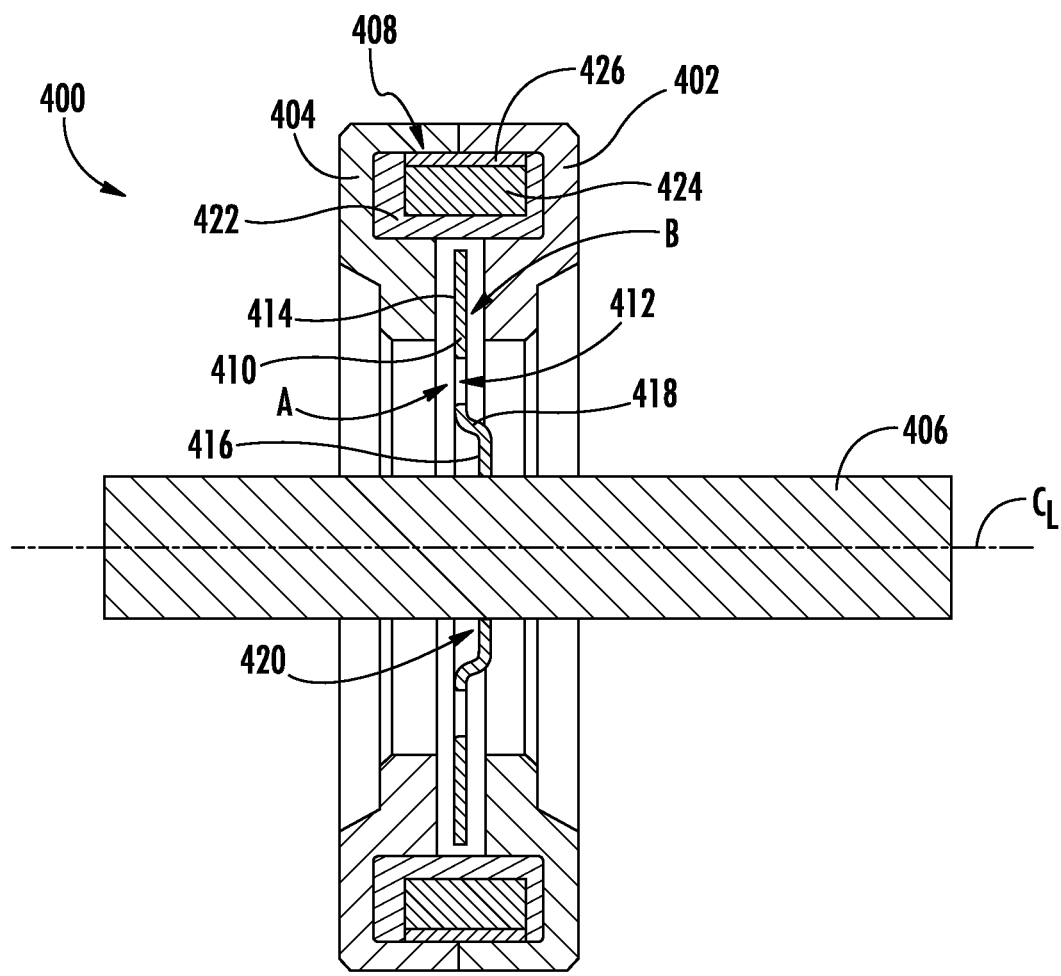
FIG. 11 is a cross-section view of an exemplary system including a single bent rotor.

Referring now to FIG. 11, a resistive torque-generating system, generally designated 400, is illustrated. System 400 differs from systems 200, 300A, and 300B, described above, in that it does not have a stator disk and there is only a single bent rotor, generally designated 410. In some embodiments, a single rotor system, such as system 400, is beneficial as it provides torque generation capabilities despite tight space constraints within the system and increases the ease of assembly. In some embodiments, system 400 comprises a resistive torque-generating device or system for generating torque for any suitable application, not limited to braking applications, clutching applications, feedback applications, or the like. System 400 may be used within vehicles, fitness equipment, power equipment (e.g., lawnmowers, etc.) or any other suitable component.

In some embodiments, system 400 is used within a braking device, such as an MR braking device. System 400 includes at least one bent rotor 410. System 400 is disposed within a housing configured to enclose or house one or more rotating components, non-rotating components, and MR material that collectively operate to generate a variable torque or resistance to rotation. In some embodiments, the variable torque that is generated is transmitted to a steering component (not shown) such as a steering wheel via a shaft for use in steer-by-wire or tactile feedback applications, drive wheels for clutching or braking applications, and/or any other components associated with rotating machinery. In some embodiments, system 400 is configured to generate a variable torque for providing tactile/sensory feedback for use in non-mechanical (e.g., steer-by-wire) steering applications.

As illustrated in FIG. 11, system 400 includes housing comprising a first pole piece 402 and a second pole piece 404 both enclosing a coil 408. In some embodiments, first pole piece 402 and second pole piece 404 both have bearings (not shown) to support shaft 406. The addition of bearings may apply to any of the embodiments illustrated in the FIGS. or disclosed herein. [In some embodiments, one bent rotor 410 is disposed between first pole piece 402 and second pole piece 404 and is configured to rotate about shaft 406. In some embodiments, where space within the enclosure housing first pole piece 402 and second pole piece 404 is limited, it is desirable to fix rotor 410 in an axial position relative to a centerline $C_L$ of system 400. In this configuration, system 400 may include at least one rotor 410 bent relative to a centerline $C_L$ in order to meet certain diameter requirements of system 400. As such, shaft 406 extends through a center of bent rotor 410, such that a centerline $C_L$ of shaft 406 corresponds to a centerline $C_L$ of system 400.

In some embodiments, bent rotor 410 is formed similarly to the embodiments of rotors 310A, 310B described with regard to FIGS. 7-10B. For example, bent rotor 410 comprises a plurality of holes 412 disposed on a top surface 414 of the rotor. Top surface 414 of rotor 410 transitions to a bottom surface 416 via a bend or bent transition 418. Alternatively, bent rotor 410 comprises a shape, design, configuration, material, etc., other than that described with regard to FIGS. 7-10B. As illustrated in FIG. 11, bend 418 in bent rotor 410 is disposed close to shaft 406 with bottom surface 416 of rotor 410 facing towards a left direction. However, bottom surface 416 can be facing oppositely, towards the right direction.

In some embodiments, rotor 410 comprises a space, generally designated 420, formed between bottom surface 416 and an interior surface of second pole 404. In one embodiment, space 420 is sized between approximately two millimeter and five millimeters. However, any desired size compatible with the design is contemplated. Space 420 is configured to receive a generic fastening device (not shown), such as a nut, lock washer, etc., or a spacer ring (not shown) in order to axially fix bent rotor 410 in a specific axial position, such that bent rotor 410 is rotatable about shaft 406. For example, an approximately four millimeter thick hexagonal nut is disposable around shaft 406 and adjacent to bottom surface 416 of bent rotor 410. However, any type of arrangement may be used in order to retain rotor 410 in the desired position and avoid magnetic flux jumping.

As discussed above with regard to FIG. 1, coil 408 comprises an electrically conductive material and/or electromagnetic material disposed around a bobbin 422 comprising a non-conductive, non-metallic, and/or non-magnetic material. For example, coil 408 includes any suitable length of metallic winding 424 wrapped around a non-metallic bobbin 422. Preferably, coil 408 comprises an electromagnetic material, while bobbin 422 comprises a non-metallic material (e.g., plastic, polymeric, etc.). In some embodiments, coil 408 is configured to electrically power and energize system 400 thereby providing a magnetic flux or field through a magnetic material to generate torque.

In some embodiments, bobbin 422 is formed as a spindle or cylinder having a perimeter about which winding 424 is coiled, wrapped, or wound about. Bobbin 422 includes any suitable material, for example, a non-metallic plastic, polymeric, or ceramic material that is electrically insulating. In some embodiments, winding 424 is configured to generate a magnetic field upon being energized or electrically activated via an electrical current. Winding 424 includes an electromagnetic material configured to generate an electromagnetic field within a magnetic medium (e.g., MR material) to generate a torque or resistance that opposes the rotation of bent rotor 410. A thin layer of potting material 426 is disposed over an entirety or a substantial entirety of winding 424 for reducing vibrations resulting from the energized and/or electrically activated of winding 424 and/or for preventing electrical current from spreading into adjacent components surrounding system 400.

In some embodiments, winding 424 is in electrical communication with an electrical unit (not shown). The electrical unit may include one or more sensors, switches, capacitors, signal conditioners, analog or digital circuitry, or the like for employing power and control algorithms, communications circuitry, as well as any other circuitry and like components. At least one wire (not shown) is configured to run from at least one exterior face of bobbin 422 for supplying electrical current from the electrical unit (not shown) to winding 424 for powering, energizing, and/or otherwise electrically activating the winding.

Based on the configuration of resistive torque-generating system 400 provided in FIG. 11, gaps between poles 302, 304, rotor 410, and one or more portions of bobbin 322 define multiple separate shear areas, each having two shear surfaces. In some aspects, at least two shear areas are provided. For example, a first shear area A may be formed between one or more portions of bobbin 422, an interior surface of second pole 404 and a first surface of bent rotor 410. A second shear area B may be formed between one or more portions of bobbin 422, an interior surface of first pole 402 and a second, opposing surface of bent rotor 410. Thus, resistance is generated via contact with at least four shear surfaces.

Figure 12:
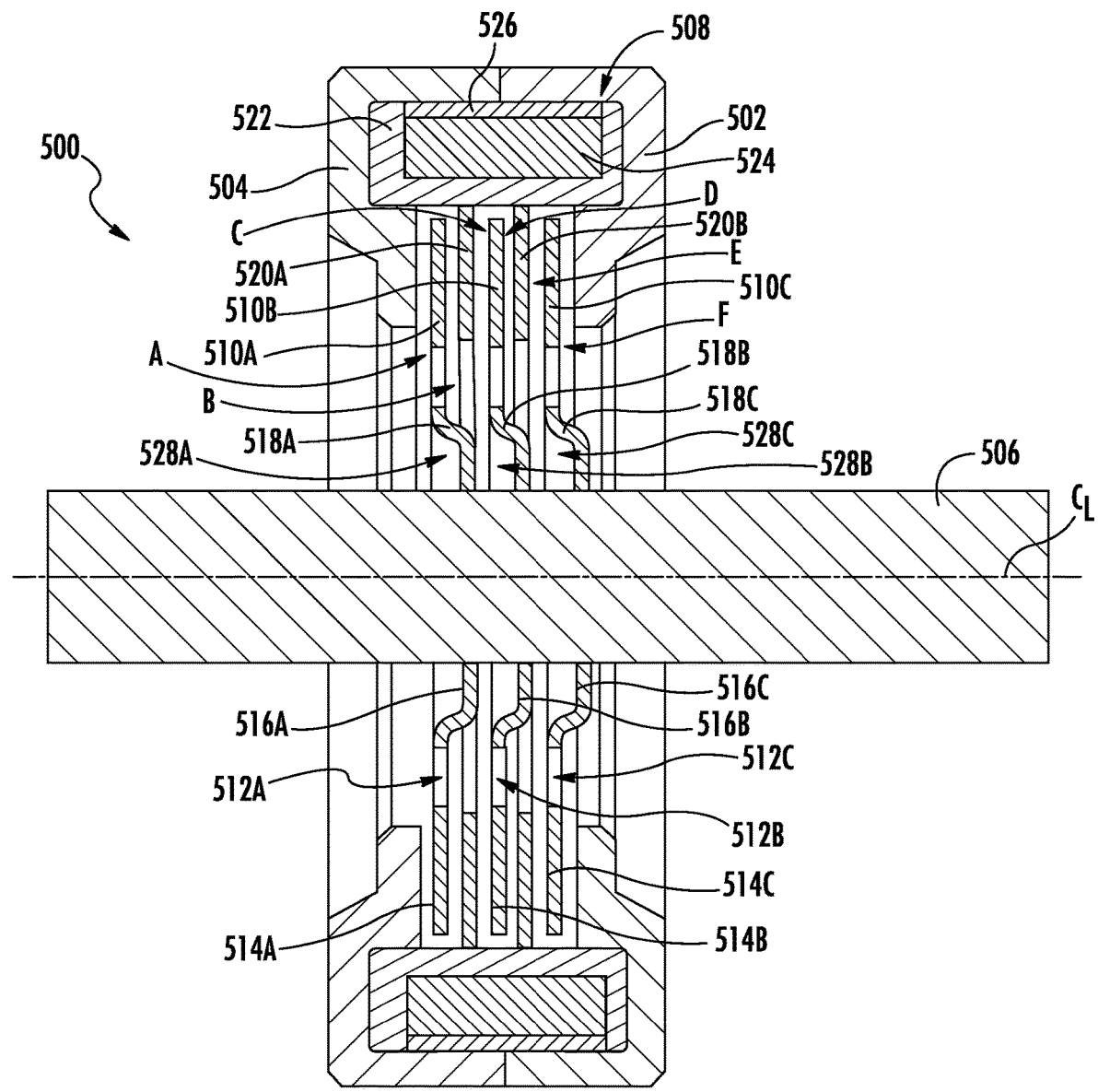
FIG. 12 is a cross-section view of an exemplary system including two stators and three bent rotors.

Referring now to FIG. 12, a resistive torque-generating system, generally designated 500, is illustrated. System 500 differs from systems 200, 300A, 300B, and 400 described above, for a least the reason that it comprises two stators and three rotors. In some embodiments, a dual stator system, such as system 500, is beneficial as it provides increased torque generation capabilities despite tight space constraints within the system. In some embodiments, system 500 includes a resistive torque-generating device or system for generating torque for any suitable application, not limited to braking applications, clutching applications, feedback applications, or the like. System 500 may be used within vehicles, fitness equipment, power equipment (e.g., lawnmowers, etc.) or any other suitable component.

In some embodiments, system 500 is used within a braking device, such as an MR braking device. System 500 includes two stators and three rotors that configured to be enclosed within a housing, and with MR material, collectively operate to generate a variable torque or resistance to rotation. The variable torque that is generated with system 500 is transmitted to a steering component such as a steering wheel via a shaft for use in steer-by-wire or tactile feedback applications, drive wheels for clutching or braking applications, and/or any other components associated with rotating machinery. System 500 is also configured to generate a variable torque for providing tactile/sensory feedback for use in non-mechanical (e.g., steer-by-wire) steering applications.

As illustrated in FIG. 12, system 500 includes a housing with a first pole piece 502 and a second pole piece 504 enclosing a coil 508. In some embodiments, three bent rotors 510A-510C, respectively, are provided. For example, third bent rotor 510C is disposed closest to first pole piece 502, first bent rotor 510A is disposed closest to second pole piece 504 and second rotor 510B is disposed in between first and third rotors 510A, 510C. Each of three rotors 510A-510C is configured to rotate about shaft 506. In some embodiments, where space within the housing enclosing first pole piece 502 and second pole piece 504 is limited, it is desirable to fix rotors 510A-510C in an axial position relative to a centerline $C_L$ of system 500. As illustrated, system 500 include at least one of three bent rotors 510A-510C bent relative to a centerline $C_L$ in order to meet design diameter requirements of system 500. For example, system 500 includes each bent rotor 510A-510C being bent relative toward centerline $C_L$. Shaft 506 extends through a center of each of three bent rotors 510A-510C, such that a centerline $C_L$ of shaft 506 corresponds to a centerline $C_L$ of system 500.

In some embodiments, each of three bent rotors 510A-510C is formed similarly to the embodiments of rotors 310A, 310B described with regard to FIGS. 7-10B. Each of three bent rotors 510A-510C comprises a plurality of holes 512A-512C disposed on a top surface 514A-514C of bent rotors 510A-510C. For example, top surface 514A of first bent rotor 510A transitions to a bottom surface 516A of rotor 510A via a bend or bent transition 518A. Likewise, top surface 514B of second bent rotor 510B transitions to a bottom surface 516B of rotor 510B via a bend or bent transition 518B, and top surface 514C of third bent rotor 510C transitions to a bottom surface 516C of rotor 510C via a bend or bent transition 518C. Alternatively, each of three bent rotors 510A-510C comprises a shape, design, configuration, material, etc., other than that described with regard to FIGS. 7-10B, such that the three rotors may comprise similar and/or different configurations. The three bent rotors 510A-510C illustrated in FIG. 12, have each bend 518A-518C in bent rotors 510A-510C is disposed close to shaft 506 with bottom surfaces 516A-516C of each bent rotor 510A-510C facing towards a left direction. Similar to the systems 300, 300A and 400 discussed above, bent rotors 510A-510C may face oppositely towards a right direction.

In some embodiments, system 500 further comprises two stators 520A, 520B. In some embodiments, each of two stator disks 520A, 520B are configured to be integrated with bobbin 522. In such a manner, stator disks 520A, 520B each comprise a shape, material, design, etc., that enable them to be integrated into bobbin 522. For example, stator disks 520A, 520B are each formed as a substantially 'straight' or planar stator disk with a cross-section that is perpendicular to coil 508. As illustrated in FIG. 12, first stator disk 520A is a planar stator disk that is disposed between first bent rotor 510A and second bent rotor 510B, while second stator disk 520B is a planar stator disk that is disposed between second bent rotor 510B and third bent rotor 510C. In such a manner, first stator disk 520A is not in contact with first or second bent rotors 510A, 510B, and is separated therefrom by shear areas. Likewise, second stator disk 520B is not in contact with either second or third bent rotors 510B, 510C, and is separated therefrom by shear areas. In other embodiments, each of stator disks 520A, 520B is comprised of different integration configurations.

Alternatively, in some embodiments (not shown), stator disks 520A, 520B are each shaped, sized, etc., like the stator disk described in FIG. 3B to be incorporated with electromagnetic coil 508 and/or a non-metallic member supporting the coil, such as a non-metallic bobbin 522, to form a single integrated component. For example, stator disks 520A, 520B may each be incorporated (e.g., injection molded within) plastic bobbin 522, such that stator disks 520A, 520B are each configured to provide a resistance to prevent stator disks 520A, 520B from rotating within bobbin 522 during or after molding. In this manner, disks 520A, 520B are perpendicular to winding 324 and/or potting 326 and are separated from winding 324 by a specified range.

More particularly, stator disks 520A, 520B may each include any suitable material, for example, any metal or metallic material (e.g., aluminum (Al), steel, iron (Fe), alloys thereof, etc.), any non-metallic material (e.g., plastic, polymeric, etc.), a magnetic material, a non-magnetic material, and/or any combinations thereof. In some embodiments, stator disks 520A, 520B each include a soft magnetic alloy comprising iron.

In some embodiments, each of stator disks 520A, 520B may be formed from a stamping process, such that the resulting stator disks 520A, 520B are a "stamped" stator disk. Stamping stator disks 520A, 520B results in a dimensionally reliable product that can be manufactured relatively inexpensively. Other suitable processes for producing stator disks 520A, 520B may include casting, machining, forging, pressing, extruding, or the like.

Still referring to FIG. 12, coil 508 includes an electrically conductive material and/or electromagnetic material disposed about a non-conductive, non-metallic, and/or non-magnetic bobbin 522. For example, coil 508 may include any suitable length of a metallic winding 524 wrapped around a non-metallic bobbin 522. Preferably, coil 508 comprises an electromagnetic material, while bobbin 522 comprises a non-metallic material (e.g., plastic, polymeric, etc.). In some embodiments, coil 508 is configured to electrically power and energize a system incorporating integrated stator disk device thereby providing a magnetic flux or field through a magnetic material to generate torque.

In some embodiments, bobbin 522 may be formed as a spindle or cylinder having a perimeter about which winding 524 is coiled, wrapped, or wound about. Bobbin 522 may include any suitable material, for example, a non-metallic plastic, polymeric, or ceramic material that is electrically insulating. In some embodiments, bobbin 522 includes plastic that is injection molded about stator disks 520A, 520B. For example, bobbin 522 may be formed via an injection molding process, such that the resulting bobbin 522 is a molded bobbin 522 having stator disks 520A, 520B integrated therein. Stator disks 520A, 520B may be used as an insert during injection molding, such that stator disks 520A, 520B are over-molded within a center of bobbin 522 to form a single, integrated component. In this example, stator disks 520A, 520B may be produced such that their dimensions are smaller than that of a mold created for bobbin 522 in order for stator disks 520A, 520B to be wholly integrated into bobbin 522 and coil 508.

In some embodiments, bobbin 522 is over-molded about one or more of previously stamped stator disks 520A, 520B. As noted above, stamping provides a dimensionally stable and reliable disk(s) that can be manufactured inexpensively. After over-molding bobbin 522 about one or more stator disks 520A, 520B, an integrated stator disk device 500 is provided. Over-molding stator disks 520A, 520B does not negatively affect the effective diameter of a resistive torque-generating unit or system incorporating device, and therefore provides a high on-state torque level. Such a multiple disk approach is beneficial when the off-state torque of the MR system (e.g., brake, clutch, or the like) is not critical or it is not the additional drag created by the field responsive material and parts in relative motion, which dominate the off-state torque.

In some embodiments, winding 524 is configured to generate a magnetic field upon being energized or electrically activated via an electrical current. Winding 524 may include an electromagnetic material configured to generate an electromagnetic field within a magnetic medium (e.g., MR material) to generate a torque or resistance that opposes the rotation of rotors 510A-510C disposed within a resistive torque-generating device. A thin layer of potting material 526 is disposed over an entirety or a substantial entirety of winding 524 for reducing vibrations resulting from the energized and/or electrically activated of winding 524 and/or for preventing electrical current from spreading into adjacent components surrounding device 500.

In some embodiments, winding 524 is in electrical communication with an electrical unit (not shown) that may include one or more sensors, switches, capacitors, signal conditioners, analog or digital circuitry, or the like for employing power and control algorithms, communications circuitry, as well as any other circuitry and like components. At least one wire (not shown) is configured to run from at least one exterior face of bobbin 522 for supplying electrical current from the electrical unit (not shown) to winding 524 for powering, energizing, and/or otherwise electrically activating the winding.

In some embodiments, each of three rotors 510A-510C form a space, generally designated 528A-C. For example, a first space 528A is formed between bottom surface 516A of first bent rotor 510A and an interior surface of second pole 504. In this example, a second space 528B is formed between bottom surface 516B of second bent rotor 510B and first stator 520A, while a third space 528C is formed between bottom surface 516C of third bent rotor 516C and second stator 520B. Spaces 528A-528C are sized between approximately two millimeters and five millimeters. However, any desired size compatible with the design is contemplated. In some aspects, each of spaces 528A-528C are configured to receive a generic fastening device (not shown), such as a nut, lock washer, etc., or a spacer ring (not shown) in order to axially fix each of bent rotors 510A-510C in a specific axial position, such that bent rotors 510A-510C are each rotatable about shaft 506. For example, an approximately four millimeter thick hexagonal nut is disposable around shaft 506 and adjacent to bottom surface 516A-516C of each of bent rotors 510A-510C. Alternatively, only one or more of bent rotors 510A-510C receive a generic fastening device. However, any type of arrangement may be used in order to retain rotors in the desired position.

Based on the configuration of resistive torque-generating system 500 provided in FIG. 12, gaps between poles 502, 504, rotors 510A-510C, and stator disks 520A-520B, and one or more portions of bobbin 522 define multiple separate shear areas, each having two shear surfaces. In some aspects, at least six shear areas are provided. For example, a first shear area A is formed between an interior surface of second pole 504 and a first surface of first bent rotor 510A. A second shear area B is formed between a second opposing surface of first bent rotor 510A and a first surface of first stator 520A. A third shear area C is formed between a second opposing surface of first stator 520A and first surface of second bent rotor 510B. A fourth shear area D is formed between a second opposing surface of second bent rotor 510B and a first surface of second stator 520B. A fifth shear area E is formed between a second opposing surface of second stator 520B and a first surface of third bent rotor 510C. A sixth shear area F is formed between an interior surface of first pole 502 and a second, opposing surface of third bent rotor 510B. Thus, resistance is generated via contact with at least 12 shear surfaces.

In some embodiments, in order to maximize the area between the field responsive material (e.g., MR material) and the parts in relative motion, a configuration of using one or more rotors with or without an integrated stator disk is employed. In some embodiments, rotor(s) and/or stator disk(s) are made of soft magnetic alloys. This provides an increased friction area in the zone where magnetic field can be applied and therefore significantly increasing the maximum achievable on-state torque.

In some embodiments, system 600 includes a brake for use with field responsive material. The brake utilizes an integrated stator device for generating torque upon inducing a magnetic field in MR material.

System 602 comprises a plurality of pole pieces, one or more rotors either of the bent or straight variety, and/or at least one integrated stator disk, as previously described. System 602 alternatively comprises, in some embodiments, three or more rotors. Steering device 604 includes, in some embodiments, a steering wheel, handle, etc. by which an operator steers a vehicle, machine, and/or equipment. In some embodiments, system 602 physically connects to steering device 604 via shaft 606. In response to an operator turning, rotating, or moving steering device 604, system 602 generates a variable torque. System 602 generates an increased variable torque where there are two or more rotors, in comparison with single rotor designs, by creating a resistance across four shear areas through MR material via an energized coil. System 602 utilizes at least one rotor and, in some embodiments, utilizes at least one integrated stator disk for providing two or more shear areas.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. An integrated stator disk system for resistive torque generation, the system comprising:
   at least one stator disk having a planar disk body;
   at least one rotor disposed adjacent to the at least one stator disk such that there are at least two shear areas formed by the at least one stator disk and the at least one rotor, the at least one rotor comprising:
   a first planar portion;
   a second planar portion; and
   a bend connecting the first planar portion and the second planar portion;
   wherein the second planar portion is disposed entirely concentrically within the first planar portion, such that the second planar portion is arranged concentrically about a centerline of the integrated stator disk system; and
   wherein the bend offsets the first planar portion from the second planar portion in a direction of the centerline of the integrated stator disk system, such that a plane through a midpoint of a thickness of the first planar portion in a radial direction of the integrated stator disk system is not coplanar with a plane through a midpoint of a thickness of the second planar portion in the radial direction of the integrated stator disk system;
   at least two poles positioned about the at least one stator disk and the at least one rotor;
   a coil proximate the at least two poles; and
   a magneto-responsive (MR) material disposed about a portion of the at least one rotor and between at least a portion of the at least one stator disk and the at least one rotor.

2. The integrated stator disk system of claim 1, wherein the at least one rotor comprises two or more rotors, including at least a first rotor and a second rotor, each of which comprises the bend between the first and second planar portions thereof, respectively, wherein the first rotor is positioned on a first side of the at least one stator disk, which is adjacent the first planar portion, wherein the second rotor is positioned on a second side of the at least one stator disk, which is opposite the first side and adjacent the second planar portion, and wherein the first and second rotors are spaced apart from the at least one stator disk.

3. The integrated stator disk system of claim 2, wherein a quantity of the two or more rotors is at least one more than a quantity of the at least one stator disk.

4. The integrated stator disk system of claim 1, comprising at least one spacer ring, wherein the at least one rotor comprises two or more rotors, including at least a first rotor and a second rotor, the at least one spacer ring being positioned between and in contact with the second planar portion of the first rotor and the second planar portion of the second rotor and configured to axially fix a position of the first and second rotors relative to each other in a direction of the centerline of the integrated stator disk system.

5. The integrated stator disk system of claim 1, wherein the coil comprises a non-metallic bobbin over-molded about portions of the planar disk body, wherein the at least one stator disk and the non-metallic bobbin form a single integrated component.

6. The integrated stator disk system of claim 5, wherein the coil comprises a length of metallic winding that is coiled around the non-metallic bobbin, the coil being configured to generate an electromagnetic field.

7. The integrated stator disk system of claim 5, wherein the at least one stator disk comprises one or more of flanges, notches, and/or cutouts disposed about a periphery of the planar disk body.

8. The integrated stator disk system of claim 1, wherein the at least one rotor comprises three or more rotors and the at least one stator disk comprises two or more stator disks.

9. The integrated stator disk system of claim 1, wherein the MR material is disposed between the at least two poles, the at least one stator disk and the at least one rotor.

10. The integrated stator disk system of claim 1, wherein the integrated stator disk system is configured for use on a brake device, a lock device, a clutch device, a tactile feedback device, or a steer-by-wire device.

11. A steering system comprising:
   a steering device;
   a resistive torque-generating system for providing tactile feedback to the steering device, wherein the resistive torque-generating device is attached to the steering device via a shaft and further comprises an integrated stator disk system according to claim 1.

12. The steering system of claim 11, wherein the integrated stator disk system comprises two or more rotors; including at least a first rotor and a second rotor, each of which comprises the bend between the first and second planar portions thereof, respectively, wherein the first rotor is positioned on a first side of the at least one stator disk, which is adjacent the first planar portion, wherein the second rotor is positioned on a second side of the at least one stator disk, which is opposite the first side and adjacent the second planar portion, and wherein the first and second rotors are spaced apart from the at least one stator.

13. The steering system of claim 12, wherein a quantity of the two or more rotors is at least one more than a quantity of the at least one stator disk.

14. The steering system of claim 11, wherein the integrated stator disk system includes at least one spacer ring, wherein the at least one rotor comprises two or more rotors, including at least a first rotor and a second rotor, the at least one spacer ring being positioned between and in contact with the second planar portion of the first rotor and the second planar portion of the second rotors and configured to axially fix a position of the first and second rotors relative to each other in a direction of the centerline of the integrated stator disk system.

15. The steering system of claim 11, wherein the coil comprises a non-metallic bobbin over-molded about portions of the planar disk body, wherein the at least one stator disk and the non-metallic bobbin form a single integrated component.

16. The steering system of claim 11, wherein the steering system comprises a brake device, a clutch device, a tactile feedback device, and/or a steer-by-wire device.

17. The steering system of claim 11, wherein the integrated stator disk system has n rotors and n−1 integrated stator disks.

18. The steering system of claim 17, wherein the integrated stator disk system has at least three rotors and at least two integrated stator disks.

19. The steering system of claim 17, wherein there are 4n shear surfaces between the n rotors and n−1 integrated stator disks.

20. The steering system of claim 11, wherein the MR material is disposed between the at least two poles, the at least one stator disk and the at least one rotor.

21. The integrated stator disk system of claim 1, wherein the integrated stator disk system is configured for use on a steering device employing a brake device, a lock device, a clutch device, a tactile feedback device, and/or a steer-by-wire device.

22. A bent rotor device for generating resistive torque, the bent rotor device comprising:
 a housing;
 at least two poles enclosed within the housing;
 at least one stator disk having a planar disk body and having at least a portion positioned between the at least two poles;
 at least one bent rotor positioned proximate to the at least one stator disk and comprising:
  a first planar portion;
  a second planar portion; and
  a bend connecting the first planar portion and the second planar portion;
  wherein the second planar portion is disposed entirely concentrically within the first planar portion, such that the second planar portion is arranged concentrically about a centerline of the bent rotor device;
  wherein the first planar portion is at least partially positioned between the at least two poles; and
  wherein the bend offsets the first planar portion from the second planar portion in a direction of the centerline of the bent rotor device, such that a plane through a midpoint of a thickness of the first planar portion in a radial direction of the bent rotor device is not coplanar with a plane through a midpoint of a thickness of the second planar portion in the radial direction of the bent rotor device;
 a coil comprising:
  a non-metallic bobbin disposed around an interior surface of the at least two poles; and
  a length of metallic winding that is coiled around the non-metallic bobbin, wherein the coil is configured to generate a magnetic field; and
 a magneto-responsive (MR) material disposed between at least a portion of the at least one bent rotor and the at least one stator disk.

23. The bent rotor device of claim 22, wherein the at least one bent rotor comprises two or more bent rotors, including at least a first bent rotor and a second bent rotor, each of which comprises the bend between the first and second planar portions thereof, respectively, wherein the first bent rotor is positioned on a first side of the at least one stator disk, which is adjacent the first planar portion, wherein the second bent rotor is positioned on a second side of the at least one stator disk, which is opposite the first side and adjacent the second planar portion, and wherein the first and second bent rotors are spaced apart from the at least one stator disk.

24. The bent rotor device of claim 23, wherein a quantity of the two or more bent rotors is at least one more than a quantity of the at least one stator disk, and wherein a quantity of shear surfaces is double the quantity of the two or more bent rotors.

25. The bent rotor device of claim 22, wherein the at least one bent rotor comprises three or more bent rotors and the at least one stator disk comprises two or more stator disks.

26. The bent rotor device of claim 22, wherein the bent rotor device is configured for use on a brake device, a lock device, a clutch device, a tactile feedback device, and/or a steer-by-wire device.

27. A bent rotor device for generating resistive torque, the bent rotor device comprising:
 a housing;
 at least two poles enclosed within the housing;
 at least one bent rotor comprising:
  a first planar portion;
  a second planar portion; and
  a bend connecting the first planar portion and the second planar portion;
  wherein the second planar portion is disposed entirely concentrically within the first planar portion, such that the second planar portion is arranged concentrically about a centerline of the bent rotor device;
  wherein the first planar portion is at least partially positioned between the at least two poles; and
  wherein the bend offsets the first planar portion from the second planar portion in a direction of the centerline of the bent rotor device, such that a plane through a midpoint of a thickness of the first planar portion in a radial direction of the bent rotor device is not coplanar with a plane through a midpoint of a thickness of the second planar portion in the radial direction of the bent rotor device;
 a coil comprising:
  a non-metallic bobbin disposed around an interior surface of the at least two poles; and
  a length of metallic winding that is coiled around the non-metallic bobbin, wherein the coil is configured to generate a magnetic field; and
 a magneto-responsive (MR) material disposed about a portion of the at least one bent rotor and between the at least two poles.

* * * * *